United States Patent
Carver et al.

(10) Patent No.: US 12,277,559 B2
(45) Date of Patent: Apr. 15, 2025

(54) HIGH PERFORMANCE DISTRIBUTED SYSTEM OF RECORD WITH CONFIDENCE-BASED CONSENSUS

(71) Applicant: Akamai Technologies, Inc., Cambridge, MA (US)

(72) Inventors: David C. Carver, Lexington, MA (US); Leen K. Al Shenibr, Brookline, MA (US); Samuel Delaughter, Cambridge, MA (US); Samuel Erb, Somerville, MA (US); Vladimir Shtokman, Newton, MA (US); Patrick A Deegan, New York, NY (US); Thomas Houman, Beverly, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/697,336

(22) Filed: Nov. 27, 2019

(65) Prior Publication Data
US 2020/0167779 A1 May 28, 2020

Related U.S. Application Data

(60) Provisional application No. 62/771,792, filed on Nov. 27, 2018.

(51) Int. Cl.
*G06Q 20/40* (2012.01)
*G06Q 20/36* (2012.01)
(Continued)

(52) U.S. Cl.
CPC ........... *G06Q 20/401* (2013.01); *G06Q 20/36* (2013.01); *G06Q 20/382* (2013.01);
(Continued)

(58) Field of Classification Search
CPC .......... G06Q 20/401; G06Q 20/00–425; H04L 9/00–40; H04L 2209/00–88
(Continued)

(56) References Cited

U.S. PATENT DOCUMENTS

2016/0191664 A1\* 6/2016 Balakrishnan ...... H04L 67/1097
709/203
2017/0323392 A1 11/2017 Kasper et al.
(Continued)

FOREIGN PATENT DOCUMENTS

WO 2017162904 A1 9/2017

OTHER PUBLICATIONS

International Search Report and Written Opinion, PCT/US2019/063598, mailed on Apr. 3, 2020, 9 pages.
(Continued)

*Primary Examiner* — Chenyuh Kuo
(74) *Attorney, Agent, or Firm* — David H. Judson

(57) ABSTRACT

A high-performance distributed ledger and transaction computing network fabric over which large numbers of transactions are processed concurrently in a scalable, reliable, secure and efficient manner. In one embodiment, the computing network core is configured to support a distributed blockchain network that organizes data in a manner that allows communication, processing and storage of blocks of the chain to be performed concurrently at very high performance and low latency, even when the transactions themselves originate from distant sources. This data organization relies on segmenting a transaction space within autonomous but cooperating computing nodes that are configured as a processing mesh. The system also provides for confidence-based consensus and automated fork resolution. The approach enables the blockchain to continue operating in the presence of an underlying network outage, and to enable
(Continued)

clients to make decisions about the disposition of transactions during any period of uncertainty before full consensus has been achieved.

13 Claims, 13 Drawing Sheets

(51) Int. Cl.
*G06Q 20/38* (2012.01)
*H04L 9/32* (2006.01)
*H04L 9/00* (2022.01)

(52) U.S. Cl.
CPC .............. *H04L 9/3236* (2013.01); *H04L 9/50* (2022.05); *H04L 2209/56* (2013.01)

(58) Field of Classification Search
USPC .......................................................... 705/67
See application file for complete search history.

(56) References Cited

U.S. PATENT DOCUMENTS

| 2017/0344580 | A1 | 11/2017 | King | |
|---|---|---|---|---|
| 2019/0306190 | A1* | 10/2019 | Suraparaju | G06F 21/602 |
| 2019/0384834 | A1* | 12/2019 | Nelluri | G06F 16/1805 |
| 2020/0044856 | A1* | 2/2020 | Lynde | G06Q 40/04 |
| 2020/0076586 | A1* | 3/2020 | Zhang | H04L 9/0833 |
| 2020/0084041 | A1* | 3/2020 | Xu | H04L 9/3239 |
| 2020/0351657 | A1* | 11/2020 | Wentz | H04L 9/3231 |
| 2021/0049600 | A1* | 2/2021 | Spector | H04L 9/085 |
| 2021/0160056 | A1* | 5/2021 | Yan | H04L 63/126 |
| 2022/0158855 | A1* | 5/2022 | Wentz | H04L 9/3247 |

OTHER PUBLICATIONS

Jesus, E. et al., "A Survey of How to Use Blockchain to Secure Internet of Things and the Stalker Attack," Hindawi, Security and Communication Networks, vol. 2018, Article ID 9675050, Apr. 8, 2018, pp. 5-6, 10, 12.

Li, Wenting, et al., "Securing Proof-of-Stake Blockchain Protocols, In: Data Privacy Management," Cryptocurrencies and Blockchain Technology; ESORICS 2017 International Workshops, DPM 2017 and CBT 2017, Oslo, Norway, Sep. 14-15, 2017, pp. 297-315, Sep. 2017 sections.

* cited by examiner

HIGH PERFORMANCE DISTRIBUTED SYSTEM OF RECORD WITH CONFIDENCE-BASED CONSENSUS

BACKGROUND

Technical Field

This application relates generally to managing a distributed system of record across a set of computing resources in a distributed network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

A blockchain is a continuously growing list of records, called blocks, which are linked and secured using cryptography. Each block typically contains a cryptographic hash linking it to a previous block, and transaction data. For use as a distributed ledger, a blockchain typically is managed by a peer-to-peer network collectively adhering to a protocol for validating new blocks. Once recorded, the data in any given block cannot be altered retroactively without the alteration of all subsequent blocks, which requires collusion of the network majority. Blockchains are suitable for the recording of events, various records management activities (such as identity management, transaction processing, documenting provenance, etc.) and others. Generalizing, a blockchain is a decentralized, distributed and digital ledger that is used to record transactions across many computers so that the record cannot be altered retroactively without the alteration of all subsequent blocks and the collusion of the network. In a typical blockchain, blocks hold batches of valid transactions that are hashed and encoded into a data structure. In this structure, and as noted above, each block includes the cryptographic hash linking it to the prior block in the blockchain. The linked blocks form a chain. This iterative process confirms the integrity of the previous block, all the way back to the original genesis (or first) block.

Blockchain implementations may be used to support a variety of application areas, some of which have elevated security requirements. In known systems, such as Bitcoin, Etherium and their derivatives, a main focus is on securing the private keys that are used by wallets (namely, to spend value associated with the wallet). In addition, wallet security continues to be an important consideration in the design and implementation of such systems, and there are also a set of extended use cases, e.g., hosted or server-based wallets, server based co-signing or multiple signature-based transactions, and administrative management of accounts and associated value, that present additional security challenges. In particular, these capabilities offer significant benefits, but they may also increase the attack surface, i.e., the number of and paths of potential compromise.

BRIEF SUMMARY

This disclosure provides for a high performance distributed ledger and transaction computing network fabric over which large numbers of transactions (involving the transformation, conversion or transfer of information or value) are processed concurrently in a scalable, reliable, secure and efficient manner. In one embodiment, the computing network fabric or "core" is configured to support a distributed blockchain network that organizes data of the blockchain in a manner that allows communication, processing and storage of blocks of the chain to be performed concurrently, with little synchronization, at very high performance and low latency, even when the transactions themselves originate from remote sources. This data organization relies on segmenting a transaction space within autonomous but cooperating computing nodes that are configured as a processing mesh. Each computing node typically is functionally-equivalent to all other nodes in the core, and preferably each node can carry the entire load of the system. A computing node typically comprises a cluster of computing, communications and storage elements. More generally, all computing nodes that comprise the core network preferably are considered to be equal to one another, and no individual node, standing alone, is deemed to be trustworthy. Further, with respect to one another, the nodes operate autonomously, and preferably no node can control another node. The nodes operate on blocks independently from one another while still maintaining a consistent and logically complete view of the blockchain as a whole.

In one embodiment, the processing core is accessible via edge networks, e.g., the edge servers of an overlay network, such as a CDN. In this embodiment, a CDN edge network supports a globally-based distributed system that provides a message processing service, wherein messages are associated with transactions. End user machines and services interact initially with the CDN edge network, which then routes transactions requests and responses to and from the core, with the core supporting a distributed system of record.

The subject matter herein introduces the concept of "confidence-based consensus" and automated fork resolution in a blockchain system of record, such as described above. In particular, the approach enables the blockchain to continue operating in the presence of an underlying network outage, and to enable clients (e.g., wallets) to make decisions about the disposition of transactions during any period of uncertainty before full consensus (fnality) has been achieved.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Overall High Level Design

Figure 1:
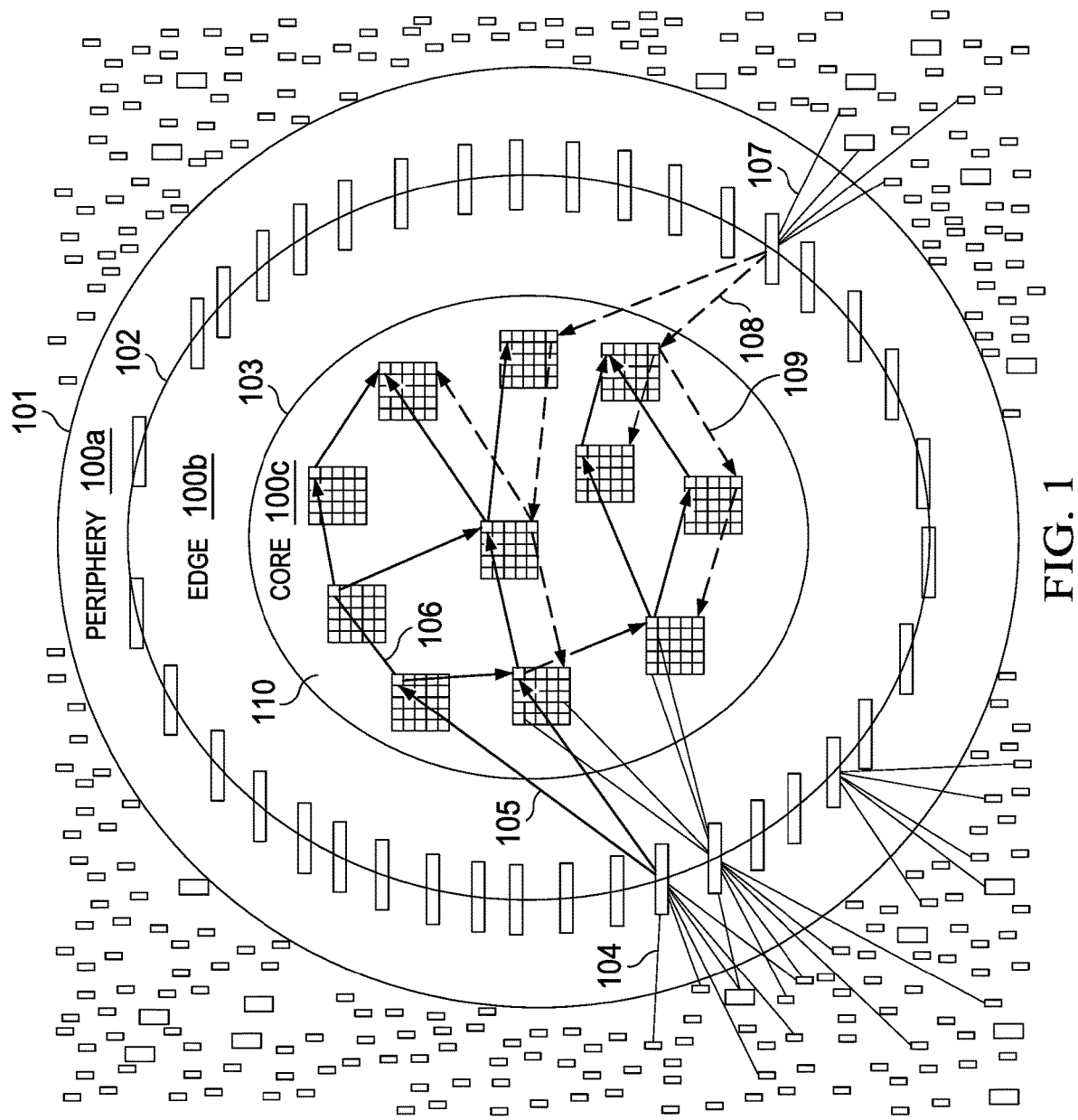
FIG. 1 is a block diagram illustrating a networking architecture that provides a distributed system of record with transactions organized into a blockchain according to this disclosure.

FIG. 1 depicts a scalable, high performance architecture for implementing a distributed system of record with transactions organized into a blockchain. At a high level, the system is divided into multiple functional areas as shown, namely, a periphery 100a, an edge 100b, and a core 100c. The system may comprise other functional areas to facilitate delivery, administration, operations, management, configuration, analytics, and the like, but for simplicity these areas are not depicted. As used herein, the periphery 100a refers generally to elements associated with a boundary 101. These elements typically include client-server based electronic wallets or wallet devices, terminal and point of sale devices, legacy financial network elements and associated adapters. Generally, and as used herein, any element involved with creating and consuming transactions including, without limitation, financial transactions, may be an element in the periphery 101. The periphery may extend globally. The edge 100b typically refers to the elements of an overlay network associated with boundary 102. Representative elements include, without limitation, the processing, communication and storage elements (edge servers, switches/routers, disks/SSDs) running on an overlay edge network (e.g., a CDN such as Akamai®). A CDN such as described advantageously provides low latency points of presence (relative to the end users/devices) that aggregate and, as will be described, route requested transactions and their associated results (to and from elements in the periphery) efficiently. Wallet services may be located within the edge. The edge elements also act individually, collectively, and in conjunction with other services as a security perimeter protecting the core 100c from attacks and other adversarial activity. While a CDN-specific implementation is preferred, a typical edge network in the system herein need not be limited to a CDN edge network. Any suitable network, new or extant, could be used including, without limitation, cloud-based systems.

The core 100c refers to elements associated with boundary 103. As will be described, preferably the core 100c is a high performance network of nodes that together support the processing and storage of transaction blockchain(s) meeting specified performance requirements including, but not limited to, throughput, response time, security and data integrity. A node (sometimes referred to as a "computing node") in this context typically is a cluster of computing, communications, and storage elements. More generally, a cluster as used herein refers to one or more, and possibly many, computing, communications, and storage elements. In one embodiment, the core 100c comprises overlay network nodes, although this is not a requirement, as the core 100c may comprise a set of nodes distinct from the CDN and dedicated to the core operations (as will be described). Typically, computing nodes are interconnected by network transits and have a high degree of interconnectivity to reduce or eliminate topological bottlenecks.

To facilitate high performance, preferably the core network is constructed using a high quality, high capacity, and diverse interconnect. The particular configuration of the core network typically is implementation-dependent, at least in part based on the nature of the consensus protocol that is implemented in the blockchain. Depending on the consensus protocol used, the size of the core network (and/or the distribution of various computing nodes therein) may also be constrained as necessary to ensure sufficiently low latency network communications across the core.

In one non-limiting implementation, the CDN edge 100b supports a globally-based service having associated therewith a core network 100c (e.g., that is located across a plurality of networked data centers in a given geography).

Referring again to FIG. 1, message 104 is an example of a device (e.g., an end user device, an electronic wallet, etc.) sending a transaction request to an edge server (e.g., such as a CDN edge server). It should be appreciated that a multitude of such messages (and that will be sent to and processed by the core network as described herein) are expected to originate from server, devices, and wallets worldwide. The messages may be transmitted over persistent connection or ephemeral connections, as well as via new or extant networks where those networks may be part of legacy or network infrastructure purpose built to natively support the system capabilities described herein. Further, messages may be sent to one or more edge servers to reduce reliance on any single point of ingress to the system.

Message 105 is an example of an edge element routing transactions (possibly including the one contained in message 104) to an appropriate element in a core node 110 (a set of which nodes 110 are depicted). For a given transaction there may be multiple messages 105 that route the same transaction or a hash (or other digest) of the same transaction to the appropriate element in other core nodes. It is not required that all messages 105 contain a full representation of a transaction. A digest of a transaction may be transmitted (1) to make core elements aware of the existence of a transaction, and (2) to provide a robust way to check the integrity of messages containing full transactions. This enables complete, yet efficient, propagation of incoming transaction messages to the appropriate elements in all core nodes. It also greatly reduces the network loading associated with traditional gossip protocols and yet provides protection, e.g., from compromised edge elements censoring or corrupting transactions.

Message 106 is an example of a core node element routing transactions to the appropriate element in another core node. There may be multiple messages 106, such that a core node element participates in propagating transactions or transaction digests across the core nodes of the system. Core nodes receiving message 106 may, in turn, generate other messages 106, further propagating the messages across the core nodes of the system.

Topology-Aware Data Propagation

While any data propagation protocol may be employed, one preferred approach herein is to improve upon cost and latency of traditional randomized peer-to-peer gossip protocols by shaping the propagation to the underlying network topology. In concert, messages 104, 105, and 106 comprise paths of propagation starting with topologically most proximate elements and reaching topologically less- or least-proximate elements. A device that sends messages 104 to other edge elements typically follows different paths of propagation across the network. This is illustrated by the messages 107, 108, and 109 propagating in a different direction. Further, the path of propagation starting from a given device, in general, may change over time to achieve proper load balancing and security.

Service Discovery and High Performance Mapping

Again referring to FIG. 1, before any messages are sent, each element originating a message typically must discover the address of the receiving element. An address may be an Internet Protocol (IP) address or some other name or number in an address space in some type of network (e.g., peer-to-peer network or overlay network). Discovering the address of another element can be achieved in a variety of ways but generally involves sending a set of element attributes to a discovery service and receiving address information in return. In one embodiment that is preferred, the attributes of the system elements to be discovered are encoded as domain names, thereby allowing the system to use a CDN's high performance domain name lookup services to return the necessary address information. Using an overlay network's mapping technology offers several advantages. It supports large domain name spaces to enable even the largest scale deployments. This enables an edge element, for example, to route transactions not just to a core node, but even to specific elements in the core node that handles the associated portions of the transactions' identifier space. This same type of fine-grained routing can be done for communications between core node elements; in particular, and using CDN DNS services, an element in one node handling a set of segments, partitions, or other groupings of transaction information can send messages directly to elements in other core nodes that handle the same segments, partitions, or other groupings of transaction information. This is advantageous because although traffic may traverse a common set of low level network routers/switches, the core nodes need not inspect and route each transaction individually. The use of the CDN name services in this manner also supports reconfiguration. In particular, when a node's configuration changes, for example, because responsibility for some portion of the transaction space is transitioned from one server to another, the changes are quickly and efficiently communicated via the name service's mapping system. Another advantage of using the CDN name services supports the notion of suspension. Thus, in the event an edge element or core node element becomes impaired or inoperative, the mapping system can map traffic away from the problem. A further advantage of using the CDN name service is the ability of such systems to support load balancing of traffic based on high resolution capacity consumption measurements. This approach also supports route and region diversity, such that a device in the periphery may receive addressing information for edge elements that share minimal underlying service and network components. CDN DNS services also support latency optimization. For example, core node elements may receive addresses for other core node elements that meet some proximity criteria.

An alternative embodiment utilizes location or direction-aware mapping. Thus, for example, a core node element may use domain names encoded with location or direction information (either geographic or topological direction) such that responses provide addresses to node elements that are in a desired location or direction or that comprise a directional graph. This capability may be intrinsic to the mapping system or an adjunct thereto. Topological mapping in this manner provides for a low latency, topology aware data propagation mechanism.

Generalizations

As used herein, a block generally refers to any aggregation or association of transaction data. There is no specific format required. A blockchain is a continuously growing list of records, called blocks, that are linked and secured using cryptography. Each block in a blockchain typically contains a cryptographic hash linking to the previous block, and transaction data. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

While the techniques herein may use a blockchain to record transaction data, this is not a limitation, as the architecture and associated transport mechanism of this disclosure system is also applicable to other organizations of transaction data. Moreover, the notion of a blockchain, as in a chain or sequence of blocks, may be any organization of blocks including, without limitation, a block tree, a block graph, or the like.

Mining is the act of generating an ordered block of transactions with a header that references a previous block in the blockchain. In public (permissionless) blockchain consensus systems, mining generally is structured as a competition; if a generated block (and its ancestors) survive the mining competition and subsequent consensus process, it is considered finalized and part of the permanent record. In an ideal system, mining responsibility from one round to the next (i.e., from one block to the next) is randomly-dispersed across participants. Formally, in an ideal system, mining decisions are not predictable, not capable of being influenced, and are verifiable. In real world applications, however, the dispersion need not be perfectly random. For example, in proof-of-work systems, the dispersion is not actually random, as entities with more mining power have a higher probability of winning the competition.

Segmentation

Traditional blockchain implementations treat the blockchain as a simple sequence of blocks. Such approaches severely limit the achievable performance of blockchain implementations, typically by creating bottlenecks in processing, communicating and storing the blockchain in its aggregate form.

In contrast, the approach described here departs from known techniques by organizing the data of a single chain in a manner that allows its communication, processing and storage to be performed concurrently, with little synchronization, at very high performance. Preferably, and as will be seen, this data organization relies on segmenting the transaction space within each node while maintaining a consistent and logically complete view of the blockchain. This approach may also be applied to each of multiple chains that comprise a set of federated or sharded blockchains, and to improve the performance of the blockchain operation thereby reducing the work and increasing the performance of off-chain (so-called "Layer-2") systems.

In this approach, the consensus algorithm that spans the network is used to ensure the system produces correct finalized results. The particular consensus algorithm(s) that may be used are not a limitation. Operations within each node, however, assume the elements of the node are correct and trustworthy. If a node fails or is corrupted by an adversary, the system relies on the rest of the network to maintain service integrity and availability as well as to support failure and intrusion detection functions. As will be seen, this design architecture enables the internals of a node to be organized as a loosely-coupled distributed system running on a high performance, low latency communications fabric such that system elements are aligned with the blockchain data organization. The resulting architecture provides a much higher performance implementation as compared to known techniques.

Block Segmentation

Figure 2:
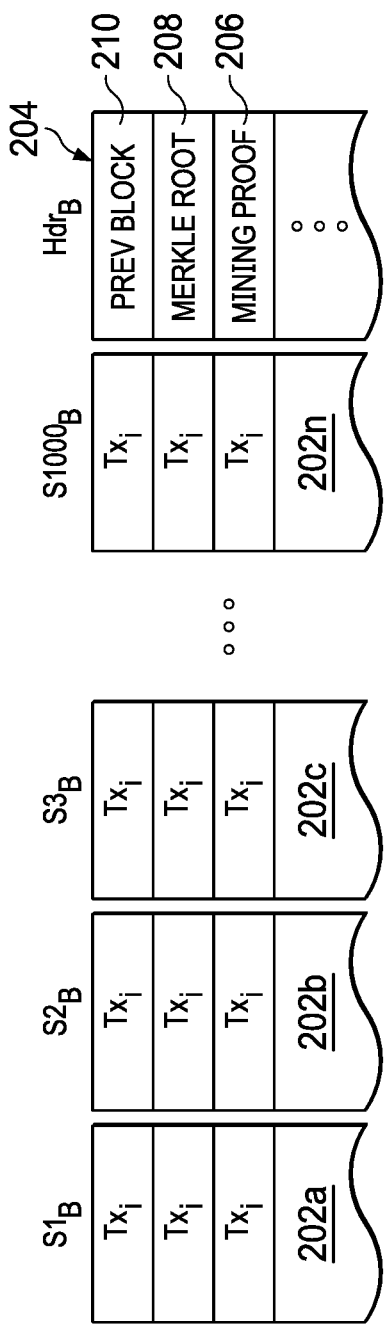
FIG. 2 depicts a block segmentation according to the technique herein.

Referring to FIG. 2, a block 200 is segmented by transaction id ($Tx_i$) into some number of segments 202a-n, where n=1000, and a header 204. The segments 202 and header 204 represent a block of the blockchain although they may be (and often are) processed, transmitted and stored separately. The number of segments 202, shown in FIG. 2 as 1000, may be more or fewer in number and may change over time or dynamically. Preferably, a sufficient number of segments is selected to create a space that is large enough to enable substantial future growth of the underlying resources without having to change the segmentation (the organization) of the data.

In this embodiment, block segmentation typically is an externally visible attribute shared by all nodes of the network. As will be seen, organizing the block data by segment significantly improves the performance and efficiency of nodes exchanging block information. In particular, the approach herein enables the components of a node responsible for handling a given segment to communicate directly with the components of other nodes responsible for handling the given segment. Moreover, the mapping of segments to components may differ across nodes, thereby allowing for scaled-up (or scaled-down) deployments, e.g., by allowing nodes to employ a different number of resources in handling the overall amount of transaction data.

In an alternative embodiment, the details of the segmentation may remain strictly a node internal attribute. In such an embodiment, the mapping of segments to the components of a node may be arbitrary. This alternative allows greater independence in the configuration of nodes, but it generally requires more granular (e.g., transaction-by-transaction) exchange of data between nodes involving some form of transaction layer routing inside the nodes.

As used herein, the term segmentation is used to mean any grouping, partitioning, sharding, etc. of transaction data, whether implicit or explicit, such that the elements of one node may interact with elements in another node to exchange data for more than one transaction at a time.

A header 204 includes several required elements, namely, a hash 210 of the previous block header, a Merkle root 208 of the block's contents, and a proof 206 indicating that a miner of the block in fact was a legitimate miner. Other information may be included.

Blockchain Segmentation

Figure 3:
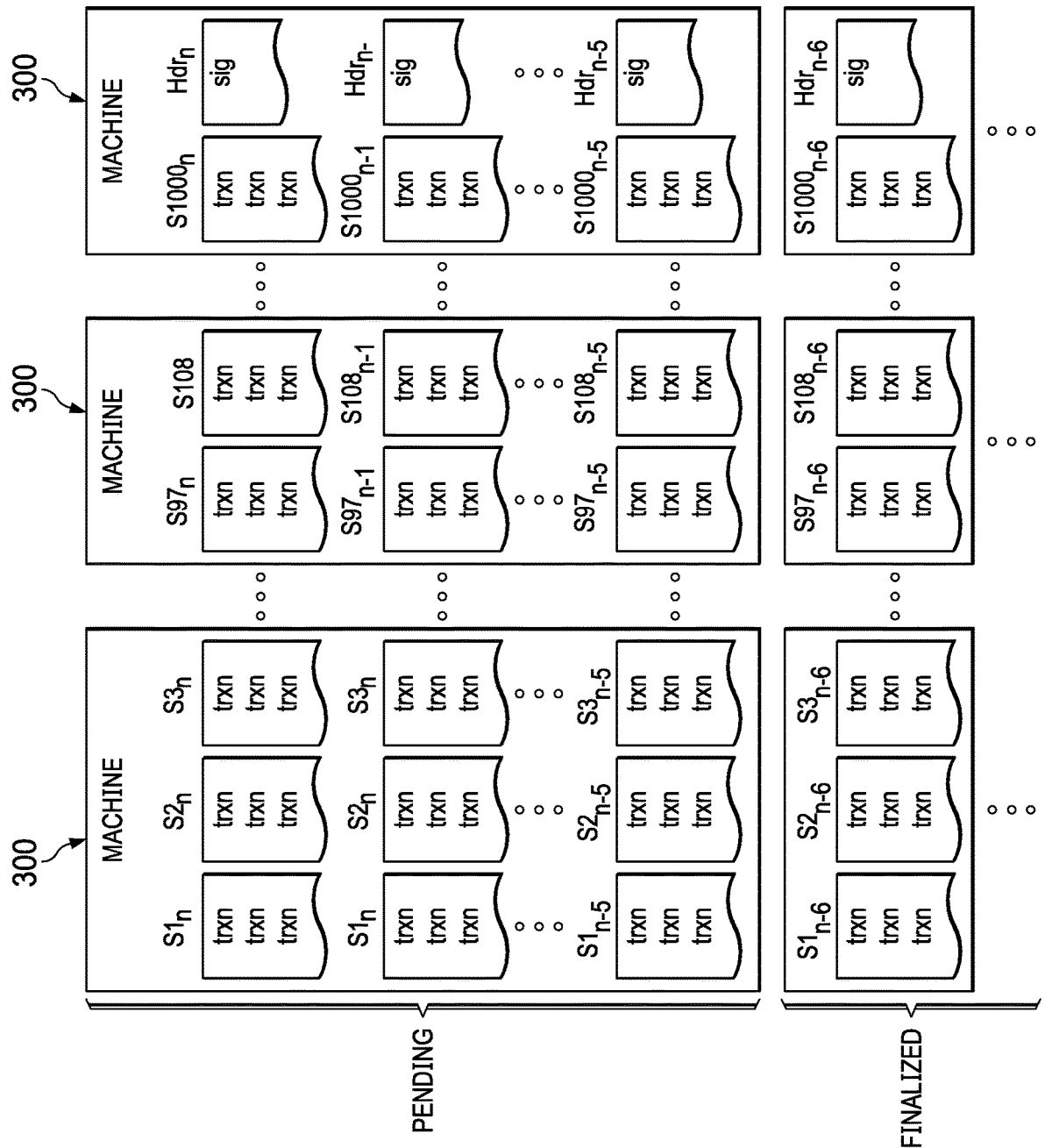
FIG. 3 depicts a segmented blockchain.

Referring to FIG. 3, the segmented blocks form, temporally, a segmented blockchain, with some blocks thereof pending (i.e., not yet finalized), while other blocks thereof are finalized (i.e., added to the blockchain). In this example, each machine 300 as depicted supports both pending and finalized blocks, although this is not a requirement. This distributed organization is not limited to a block "chain," as the approach may also be applicable in other scenarios, such as with respect to a block tree or block graph structure. The approach is advantageous because the blocks are still whole but the segments thereof are processed more efficiently than processing a block monolithically. As depicted in FIG. 3, a varying number of segments may be assigned to different machine resources and commingled. This type of organization is particularly applicable to virtualized and containerized environments, although neither are required to achieve the benefits.

Figure 4:
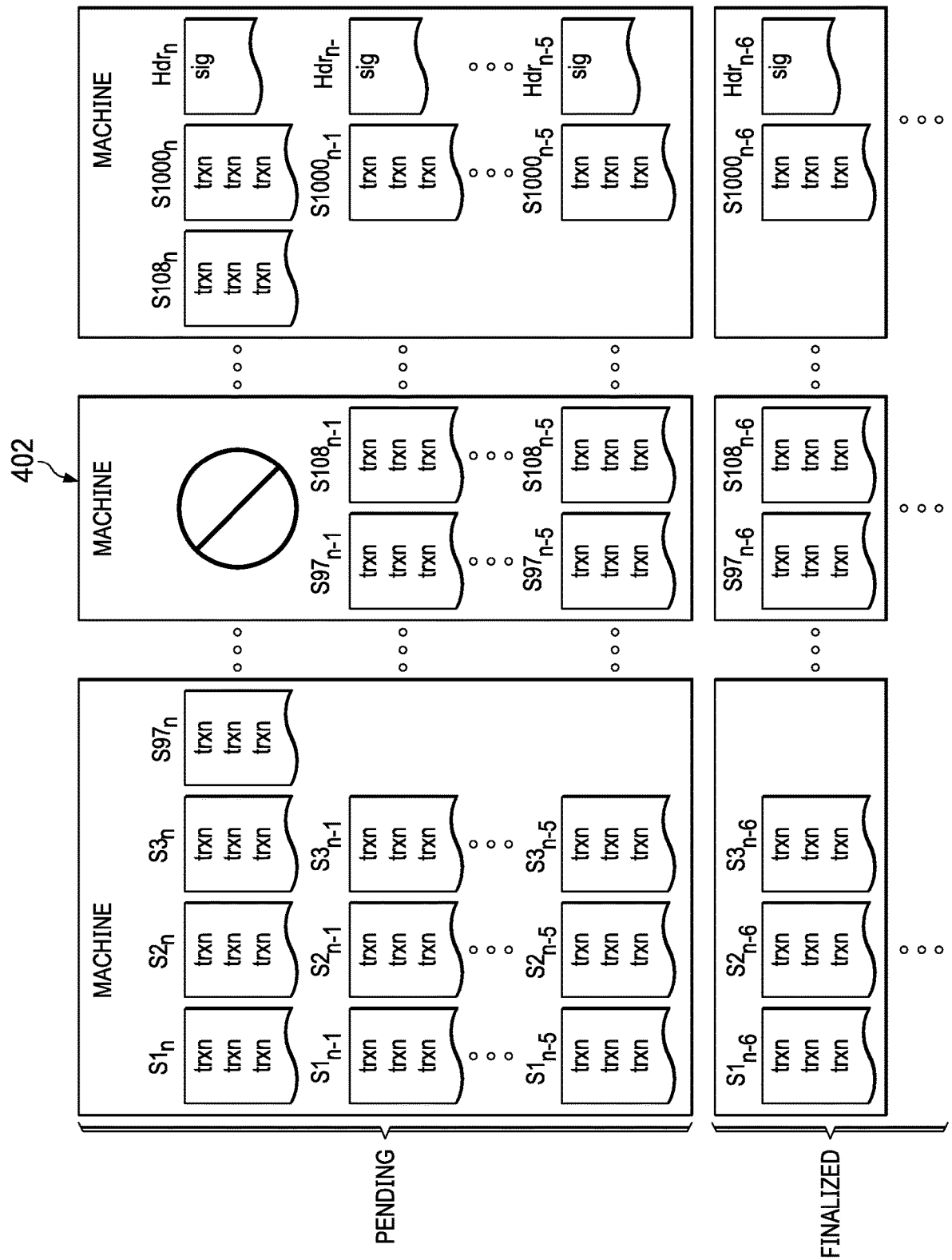
FIG. 4 depicts a segment migration and reassignment process.

Referring to FIG. 4, the assignment of segments to system resources may vary over time, for example, to support upgrades, maintenance and failure recovery. In this case, one machine 402 failed or was taken off line, and the segments it was handling are then migrated to other machines. This approach fits well with established concepts of migrating virtual or containerized computing elements both for routine and emergent reasons.

Segmentation and Inter-Node Communication

Figure 5:
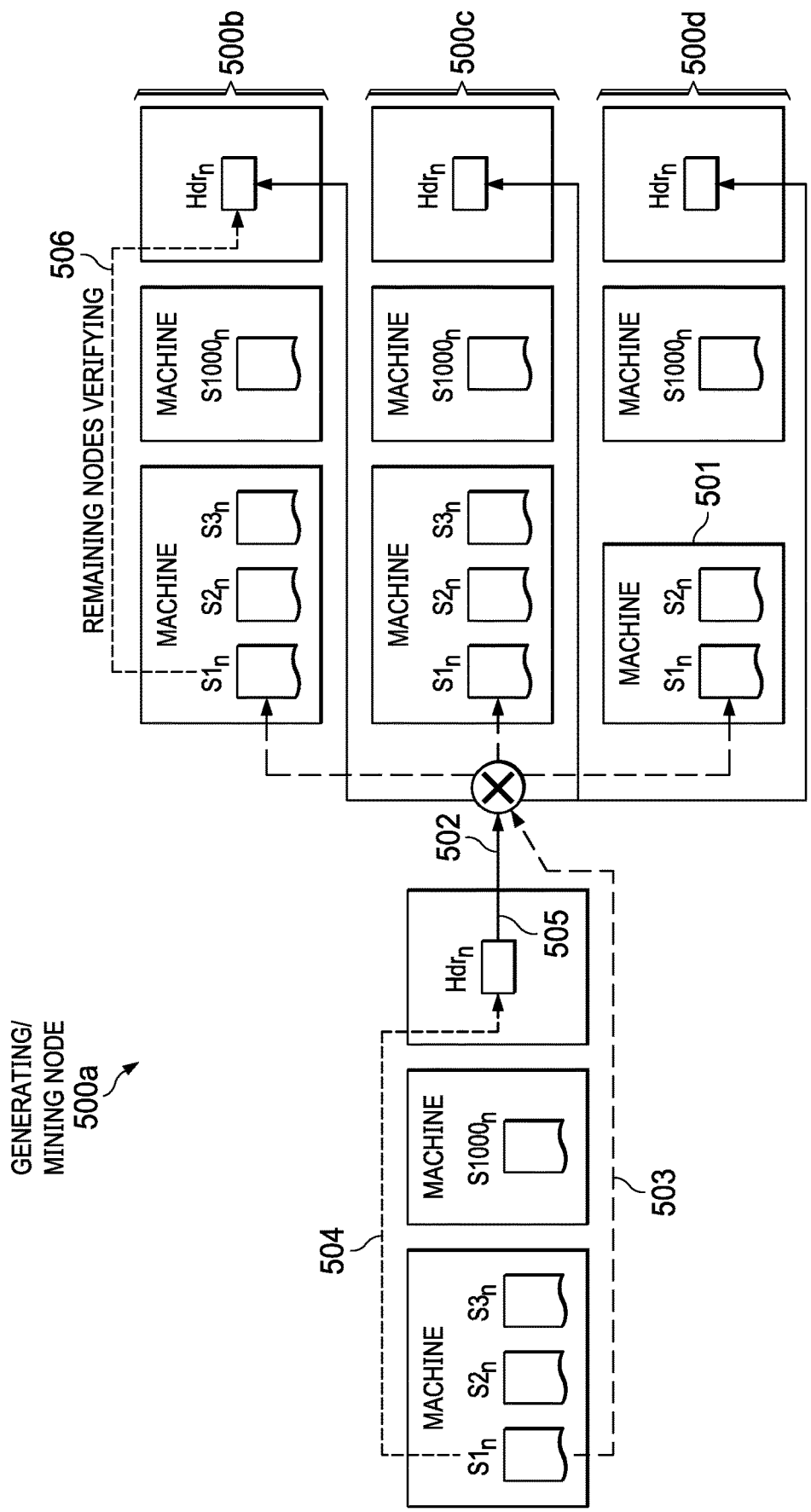
FIG. 5 depicts an inter-node segment handling process of this disclosure.

Referring to FIG. 5, by making segmentation a publicized attribute of a node, elements within a node may communicate directly with elements in other nodes to exchange information on the granularity of a segment. The mapping of segments to nodes need not be the same across all nodes.

As will be described, in a preferred embodiment the computing nodes of the system are each capable of performing (and often do perform) multiple distinct functions or modes (operating roles) such as transaction validation, as well as block mining and verification. Indeed, a given computing node often operates in multiple such modes at the same time. In a typical operating scenario, particular nodes may be used for mining, although typically all computing nodes verify what is mined.

FIG. 5 illustrates how orchestration of block mining and block verification preferably is accomplished in the presence of segmentation. In this example, it is assumed that there are a number of machines that are used for generating/mining the block in the computing node 500a, while other computing nodes 500b, 500c and 500d comprise machines that verify the block (referred to herein as "verification"). As depicted, a block mining event is initiated by message 502 sent by a mining node 500a (generally by the element that handles the generation and validation block headers) to the other nodes of the network (in this example, nodes 500b, 500c and 500d) informing them that it is about to begin mining or generating a block. Corresponding elements in nodes 500b, 500c and 500d receive this message and inform their node's processing elements to expect mined block data from elements in the mining node. At the same time, multiple sequences of messages like 503 are sent for each generated segment by the elements in the mining node handling those segments to the elements handling each segment in remote verification nodes (respectively).

Once a mined segment is finished, message 504 is sent from the element responsible for that segment to the element responsible for the block header. The message includes, among other things, the Merkle root of the generated segment. Once all messages 504 are sent and received, the element responsible for the block header creates the top of the block Merkle tree and saves the Merkle root in the header. It then transmits messages 505 to the elements in the other nodes responsible for handling header generation and verification. In performing validation, and upon receiving messages 503 for a segment, the receiving node element handling the segment validates the received transactions, computes the segment's Merkle tree, and upon completion sends message 506 to the element in the node handling the header. That element reconstructs the block header from the messages 506 for all segments and compares it to the header received from the mining node in message 505. If the headers match, the block is accepted and added to the set of pre-finalized blocks in that node.

In one embodiment, if the transactions fail to verify or the reconstructed header does not match the header transmitted from the mining node, the block is rejected, and all changes are reverted and expunged from the node.

In another embodiment, validating nodes can flag machines that mine to a different value of message 506 for the same segment, thereby safeguarding the system from one or more faulty or malicious machines.

The above-described processing is described in more detail below.

Segmentation and Node Orchestration

Figure 6A:
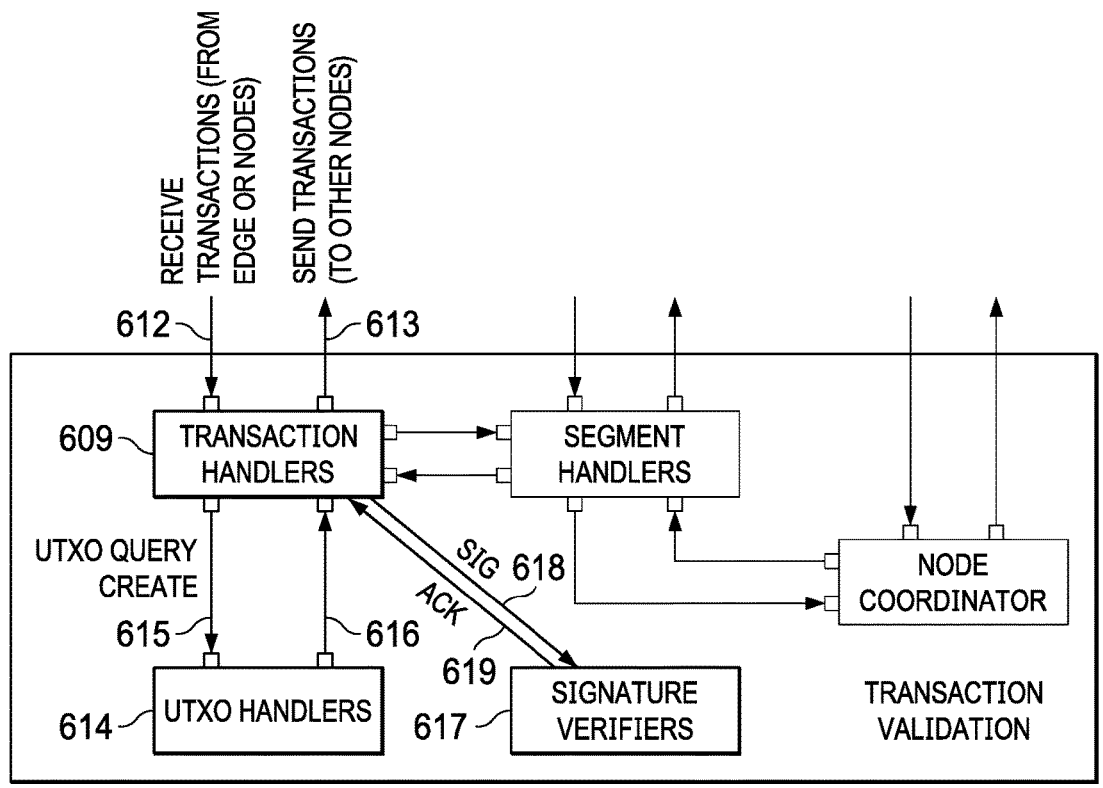
FIG. 6A depicts a representative computing node block diagram and its operation while performing transaction validation.
Figure 6B:
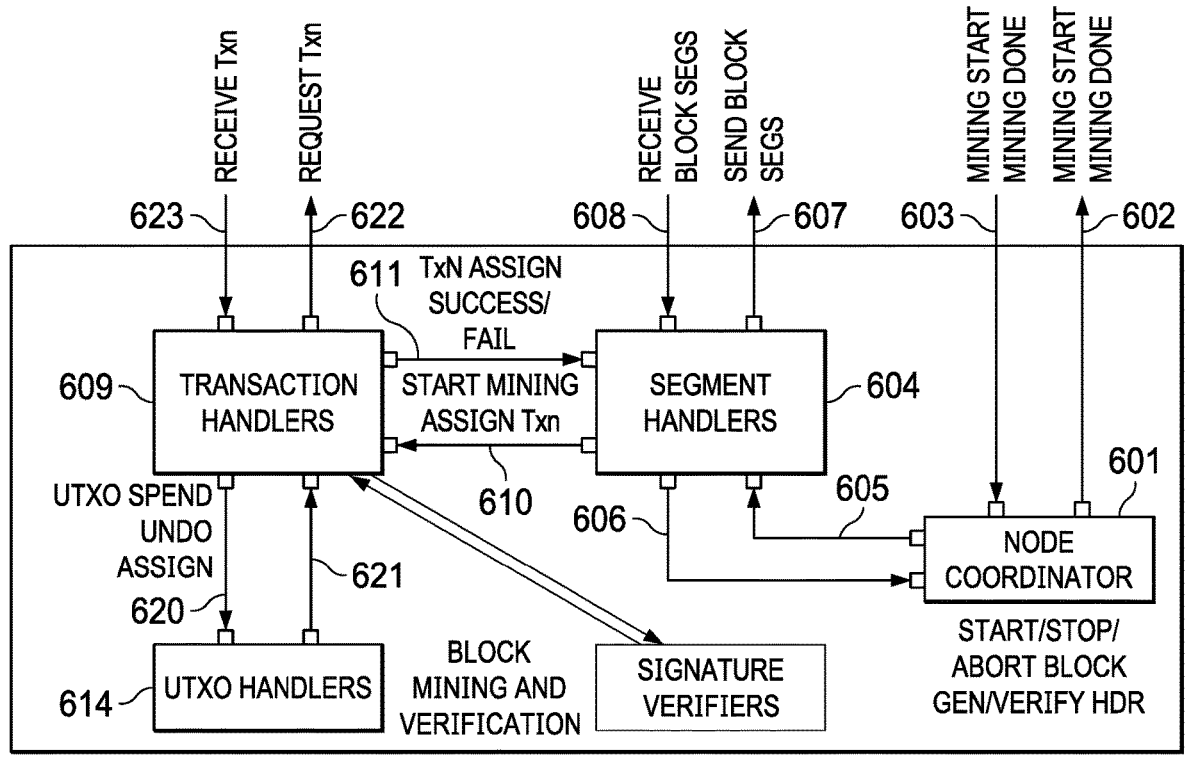
FIG. 6B depicts the computing node of FIG. 6A and its operation while performing block mining and verification.

FIG. 6A and FIG. 6B depict the operation of a computing node of the system, with FIG. 6A showing the operation of the node elements involved with initial transaction validation, and FIG. 6B showing the operation of the node elements involved with block mining and verification.

As depicted in FIGS. 6A and 6B, a node comprises several elements or components that work together to perform separately scalable tasks associated with transaction validation as well as block mining and verification. These components include node coordinator 601, a set of segment handlers 604, a set of transaction handlers 609, a set of UTXO (Unspent Transaction Output) handlers 614, and a set of signature verifiers 617. While segment and transaction handlers are shown as distinct (and this is preferred), these functions can be combined into a composite handler that performs both functions as will be described. Further, while typically there are a plurality of instances of each handler, one may suffice depending on its processing capability.

By way of background, and as noted above, preferably each node is functionally-equivalent to all other nodes in the system, and each node carries the entire load of the system. More generally, all nodes in the system are considered to be equal to one another and no individual node, standing alone, is deemed trustworthy. Further, with respect to one another, the nodes operate autonomously, and no node can control another node.

A node operates in general as follows. For transaction validation, and with reference to FIG. 6A, raw transactions are continuously received at the node at 612, typically as those transactions are forwarded from the edge machines (or from other nodes), and initially processed by the transaction handlers 609. A transaction typically is formulated in a wallet or a set of wallets (e.g., by a wallet service associated therewith or running thereon), and the wallet typically interacts with an edge machine either to receive a transaction request from the periphery or to forward a blockchain transaction to the core, where it is received at 612 and processed by a transaction handler 609. In general, the processing of a raw transaction by a transaction handler is a "validation," and once a raw transaction is "validated" by the transaction handler, the transaction is placed in the transaction handler's memory pool (or "mem pool"). A raw transaction that is not found by the transaction handler to be valid is rejected and not placed in the handler's mem pool.

To this end, upon receipt (i.e. ingress of a raw transaction to the node), the transaction handler 609 typically carries out two basic actions. As depicted in FIG. 6A, the transaction handler 609 queries UTXO handlers 614 (at 615) to determine whether inputs to the transaction exist and, if so, to obtain those inputs (at 616) from the UTXO space being managed by the UTXO handlers 614. If the inputs do not exist, the UTXO handler that receives the query informs the transaction handler, which then rejects the raw transaction. Upon receipt of inputs from the UTXO handler 614, the transaction handler 609 consults a signature verifier 617 (at 618) to determine whether a unlocking script (digital signature) associated with each input is valid. Typically, each input contains an unlocking script (digital signature) of the transaction, and thus the signature verification performed by a signature verifier involves the signature verifier checking that the signature matches the locking script (pubic key) associated with each UTXO consumed by the transaction. Further details regarding this operation are described below. This check thus involves a cryptographic operation and is computationally-intensive; thus, the signature verifier preferably is only consulted by the transaction hander for a valid input received from the UTXO handler. The signature verifier 617 acknowledges the validity of the input (in particular, the input signature) at 619. The transaction handler can interact with the UTXO handler and the signature verifier concurrently as inputs are received by the transaction handler. Once all input signatures are verified by the signature verifier 617, the raw transaction is considered by the transaction handler to the "valid" or "validated," and at 615 transaction handler 609 creates new transactions outputs (UTXOs) in the UTXO handler 614 responsible for UTXOs associated with the new transaction. In this operation, a create request is sent to only one UTXO handler, namely the one handler that handles UTXOs in the portion of the transaction id space associated with the transaction. As also depicted, the create call (at 615) is sent (after a query and signature verifier success) to initiate the new transactions outputs (UTXOs).

Once all inputs are verified in this manner, the raw transaction is then placed in the transaction handler's mem pool. The raw transaction (that has now been validated) is then output (i.e. propagated) to all other nodes via 613, and each other node that receives the raw transaction carries out a similar set of operations as has been just described. This completes the local validate operation for the raw transaction, which as a consequence is now in the transaction handler's mem pool. The above-described process continues as raw transactions are received at the node (once again, either from edge machines or from other nodes).

Thus, a transaction handler that receives a raw transaction determines (from querying the UTXO handler) whether inputs to the transaction exists and, if so, what are their values and locking scripts (containing public keys sometimes referred to as addresses or wallet addresses). It checks each input's unlocking script (digital signature), and if all signatures are valid, the transaction handler commits (saves) the raw transaction to its associated memory pool. In this manner, validated raw transactions accumulate in each handler's mem pool. Thus, in each transaction handler's mem pool there are a collection of transactions in effect "waiting" to be mined (i.e., assigned) to a block segment (and thus a block) in the blockchain. Preferably, the system enforces a minimum wait time to allow the new transactions to propagate and be validated by the other nodes of the system.

Assume now that the node coordinator 601 determines it is time to mine a block into the blockchain. The notion of mining a block is distinct from the notion of actually adding the block to the blockchain, which happens (as will be described in more detail below) when the node coordinator decides a block is final according to a prescribed consensus algorithm of the system. Typically, at any given time there is a subset of the nodes that act as "miners." According to the techniques herein, and as has been described, in lieu of mining a block as a composite, a block is mined in "segments," i.e., individual segments of the block are mined separately (albeit concurrently or in parallel) and, in particular, by the segment handlers 604.

To this end, and with reference now to FIG. 6B, the node coordinator 601 instructs its associated segment handlers 604 to begin mining their segments via 605. This command typically includes a start time, a duration, and an end time. The node coordinator also informs other node coordinators in the system (via 602) to expect mined block segment data to be transmitted directly (via 607) from the mining node's segment handlers to the segment handlers in the other nodes of the system. A segment handler's job is to obtain and receive validated raw transactions from a transaction handler's mem pool, and to stage those validated transactions for eventual persistence in the block segment (and thus the block) if and when the block is finalized and added to the blockchain. In an alternative embodiment, the segment handler may obtain and receive digests (hashes) of validated transactions, in which case the job of staging transactions for future persistence shifts to the transaction handler.

As will be described, preferably the actual persistence of each segment in the block (and the persistence of the block in the blockchain itself) does not occur until the segment handlers are instructed by the node coordinator to finalize a block. Typically, there is a 1:1 relationship between a segment handler 604 and a transaction handler 609, although this is not a limitation. As noted above, these functions may be combined in an implementation and while a 1:1 relationship is depicted, a node could be configured with any number of either type of handler.

Upon receipt of the command to initiate mining, at 610 the segment handler 604 requests the transaction handlers (handling segments for the segment handler) to assign transactions in their respective mem pools to the block and return each raw transaction (or a hash thereof). Before the transaction handler returns a raw transaction from its mem pool to the requesting segment handler, however, the transaction handler must first "spend" the transaction inputs with respect to the block being mined (i.e., apply the actual transaction values to the inputs), which it does by sending spend requests (via 620) to the UTXO handlers; as depicted, the UTXO handlers apply the spend requests, update their local data, and return the result (success or failure) to the transaction handler (via 621).

In the event of a failure response, the transaction handler must instruct the UTXO handlers via 620 to undo all successful spend operations for the transaction. This collision detection and rollback constitutes an optimistic concurrency control mechanism that obviates, and thus avoids the high costs of, acquiring a lock (or a distributed lock in the case of a node with multiple UTXO handlers) on the UTXO handler(s). This enables efficient high throughput, low latency handling of UTXO spend operations.

Upon successfully spending all the transaction inputs, the transaction handler instructs a UTXO handler via 620 to assign the transaction outputs (the transaction's UTXOs) to the block, and it forwards via 611 the raw transaction (and/or a digest thereof) back to the requesting segment handler.

The segment handler-transaction handler interactions here as just described are carried on as the transaction handler(s) continue to receive and process the raw transactions as depicted in FIG. 6A and described above. Referring back to FIG. 6B, the segment handlers 604 operate in parallel with respect to each other, with each segment handler making similar requests to its associated transaction handler. Thus, typically, there is a segment handler-transaction handler pair associated with a particular segment of the block being mined. The transaction handler 609 responds by providing the requesting segment handler 604 with each raw transaction from its mem pool, together with a digest that has been computed for the raw transaction. The segment handler 604 receives each transaction (and its digest) and sequences the transactions into a logical sequence for the segment. Each segment handler operates similarly for the raw transactions that it receives from its associated transaction handler, and thus the segments for the block are mined concurrently (by the segment handlers). As the segment handler sequences the raw transactions, it takes the digests of the transactions and outputs them (preferably just the digests) to all of the other nodes (via 607). The other nodes of the network use the digests propagated from the segment handler(s) to validate the segment that is being mined locally. A segment handler also receives digests from other segment handlers (in other nodes) via 608.

Once a segment handler 604 determines that a segment is valid, it returns the result of its processing, namely, the root of a Merkle tree computed for the segment, to the node coordinator via 606. During mining the node coordinator trusts that the segments are valid. The other segment handlers 604 (operating concurrently) function similarly and return their mining results indicating that their segments likewise complete.

Once all of the segment handlers respond to the node coordinator (with the Merkle roots of all segments), the node coordinator then computes an overall block Merkle tree (from all the segment Merkle roots) and generates a block header incorporating the overall block Merkle root and other information. The node coordinator then transmits/propagates a Mining Done message via 602 containing the block header to the other node coordinators in the network, and those other node coordinators then use the block Merkle root to complete their block verification process as will be described next.

In particular, assume now that the node coordinator 601 receives a Mining Start message via 603 transmitted from the node coordinator of another node initiating its own block mining operation. This begins a block verification process for block data mined and transmitted from the other node. The block verification process is a variation on the block mining process, but the two are distinct and frequently a node will be engaged in both processes simultaneously. Indeed, while a node typically mines only one block at a time, it can be verifying multiple incoming blocks simultaneously. As with mining, according to the techniques herein, and as has been described, in lieu of verifying a block as a composite, preferably a block is verified in "segments," i.e., individual segments of the block are verified separately (albeit concurrently or in parallel) and, in particular, by the segment handlers 604.

To this end, via 605 the node coordinator 601 instructs its associated segment handlers 604 to receive transaction hashes at 608 from other nodes and, in response, to verify the associated transaction block assignments made by the mining node's segment handlers as they mine/assign transactions to a block in the mining process. Preferably, verification of segment data is performed progressively (as the data is received) and concurrently with the mining/assignment of additional transactions to the block segments in the mining node.

Upon receipt of a transaction hash, via 608, a segment handler 604 forwards the transaction hash via 610 to the transaction handler 609 responsible for handling transactions for the segment. Upon receiving a transaction hash from a segment handler, the transaction handler 609 looks up the associated transaction record in its mem pool.

In the event the transaction is missing from the mem pool, transaction handler 609 sends a request (via 622) to receive the missing raw transaction (via 623), preferably from the transaction handler in the mining node responsible for having mined the transaction. This request/response action preferably is handled at high priority in an expedited manner. Upon receiving the missing raw transaction, and prior to resuming verification of the transaction's block assignment, the transaction handler 609 must validate the transaction as described above before adding it to its mem pool.

Upon successfully retrieving the transaction from its mem pool, the transaction handler performs an assignment of the transaction to the block segment being verified just as it assigns transactions to blocks being locally mined as described above; if, however, the assignment fails, verification of the segment and the block of which it is a part fails (i.e., the block is rejected).

Subsequently, the node coordinator, applying a prescribed consensus algorithm, decides to finalize a block. To this end, the node coordinator persists the block header, and it instructs the node's segment handlers to finalize the block. In so doing, the node coordinator provides the overall block Merkle tree to each segment handler. Each segment handler, in turn, persists its set of segments associated with the block, and it instructs its associated transaction handlers to finalize the block. In so doing, the segment handlers generate and provide to the transaction handlers the portion of the block's overall Merkle tree each transaction handler needs for its set of segments. Each transaction handler, in turn, removes the finalized transactions from its active mem pool, and it responds to any outstanding transaction requests it received from the edge (or wallet) for finalized transactions and, in particular, with a Merkle proof derived from the portion of the block's overall Merkle tree the transaction handler received from the segment handlers. The transaction handler then saves the finalized transaction in memory, where it may be used to support subsequent queries that the transaction handler may receive concerning the disposition of a transaction. The transaction handlers then instruct all UTXO handlers to finalize the block. In response, the UTXO handlers mark UTXOs spent in the finalized block as permanently spent, and mark UTXOs assigned to the finalized block as permanently created. Persisting the block header and segments to disk in this manner thus adds the block to the blockchain. Depending on implementation, the block so written to the blockchain may then be considered final (and thus in effect immutable).

Summarizing, in the node processing described above, transaction handlers receive raw transactions, typically from the edge machines. After a transaction handler validates the raw transaction (and places it in its local mem pool), the transaction handler propagates the raw transaction to the appropriate transaction handlers in other nodes that are also responsible for validating that raw transaction. Subsequently, and in response to a determination by the node coordinator to begin mining a block segment, the transaction handler mines (assigns) a set of raw transactions from its mem pool to the block segment, and sends those raw transactions (and their associated digests) to the requesting segment handler that is handling the respective segment. The segment handler sequences the received transactions into the segment and, as it does so, the segment handler forwards the list of digests for the transactions comprising the segment to the other segment handlers responsible for handling those segments in the other miner nodes. Thus, raw transactions propagate across the transaction handlers in all nodes, but segment handlers preferably only send the transaction digests for the segments to be verified. During block segment mining and verification, transaction handers consult their local segment handler(s), which as noted communicate with the segment handlers of other nodes. Transaction handlers in different nodes thus communicate with one another to populate their respective mem pools with transactions that have been validated (using the UTXO and signature-verifiers). The segment handlers (and thus the node coordinator handling the mining) communicate with one another to populate the blockchain with a block comprising the segments. As previously noted, the transaction handlers and segment handlers need not be separate services.

As described above, block verification is similar to block mining, except that for verification the segment handler is feeding transaction hashes to its transactions handlers, which transaction handlers then respond with "valid" (with respect to the raw transaction) or "invalid" (with respect to the entire received block), and the latter response should not happen unless the miner is behaving erroneously or in an adversarial manner. The above-described technique of generating and handling of Merkle trees and roots is the preferred cryptographic mechanism that ties transactions to their block. In verification, and upon completion when the node coordinator gets results from all the segment handlers, the coordinator once again computes the overall block Merkle root, but this time it compares that root with the root provided in the block header sent to it by the mining block coordinator. If they do not match, the block is discarded as invalid.

The terminology used herein is not intended to be limiting. As used herein, the term "validate" is used for the operation that the transaction handler does when it receives a raw transaction to be put in its mem pool. As noted above, to validate a transaction, the transaction handler queries the UTXO handler(s) to check the availability of the referenced UTXOs and talks to the signature-verifier to check signatures (on the inputs). In contrast, the term "verify" is used for the act of verifying the contents of block segments received from other nodes that are likewise performing the consensus initiated by the node coordinator. A transaction validation may also be deemed an "initial transaction verification" as contrasted with the "block segment verification" (what the coordinator and segment handlers do with block segment data received from other nodes) in response to the coordinator initiating a mining operation on the block (comprising the block segments). Also, the term "mine" is sometimes referred to as "assign," meaning what a transaction handler does when it is told by the segment handler to assign or associate a transaction with a block segment, i.e., the transaction handler's verification of the transaction with respect to its inclusion in a block segment by the segment handler. As noted above, to accomplish this, the transaction handler communicates with its UTXO handler to "spend" existing UTXOs, and to "assign" new UTXOs to a block segment.

Also, the notion of a "handler" is not intended to be limited. A handler is sometimes referred to herein as a "coordinator," and the basic operations or functions of a handler may be implemented as a process, a program, an instance, an execution thread, a set of program instructions, or otherwise.

While the above describes a preferred operation, there is no requirement that a handler handle its tasks on a singular basis. Thus, a segment handler can handle some or all of the segments comprising a block. A transaction handler can handle the transactions belonging to a particular, or to more than one (or even all) segments. A UTXO handler may handle some or all partitions in the UTXO space. The term "partition" here is used for convenience to distinguish from a segment, but neither term should be deemed limiting.

The following provides additional details regarding the above-described node components in a preferred implementation.

Node Coordination

Node coordinator 601 participates in a network consensus algorithm to decide whether the node should mine a block or not, and from what other nodes it should expect to receive mined block data. If the node is to mine a block, node coordinator 601 sends messages (via 602) to the other node coordinators in the network. Node coordinator 601 also receives messages (via 603) from other node coordinators in nodes that are mining a block. As has been described, node coordinator 601 informs the node's segment handler 604 in messages (via 605) to start mining block segments and from what other nodes to receive and validate mined block segments. The node's segment handler 604 will return to the node coordinator 601 in a message (via 606) the Merkle root of the transactions comprising each block segment.

Another aspect of node coordination is managing node local representations corresponding to the one or more chain branches that may be active in the network at any given time. Typically, a blockchain consists of a single sequence of blocks up to the point of finalization. Finalization often is set to be some number of blocks deep in the chain, but the decision of what and when to finalize is subject to the rules governing consensus across the network. The part of the blockchain that is pre-finalized consists of potentially multiple branch chains that get resolved before finalization. As indicated above, for example, when multiple nodes mine simultaneously, they fork the blockchain into multiple branches that have some common ancestor block. The node coordinator 601 is responsible for tracking active branches and informing the segment handlers 604 which branch they are mining, if the node is mining, and which branch each remote miner is mining.

Segment Handling

As also described, segment handlers 604 handle the generation and/or validation of some number of block segments representing a portion of block segmentation space. Specifically, the segment handlers begin generating block segments as directed by the node coordinator 601 in messages (via 605). When mining, a segment handler 604 transmits mined block segment data via 607 to segment handlers in the other nodes to be verified. A segment handler 604 receives block segment data in messages (via 608) from segment handlers in mining nodes. To perform transaction mining and validation, a segment handler 604 interacts with an associated set of transaction handlers 609 as also previously described.

Transaction Handling

Transaction handlers 609 handle the validation of transactions to be added to the mem pool and propagated to the network, the generation of transactions to be included in a mined block, and the verification of transactions to be included as part of a block received from a mining node. As noted above, the distribution of the transaction segmentation space may be the same for a transaction handler 609 and a segment handler 604, or it may be different. For example, the computational resources needed by the segment handler function may be sufficiently low that only a few such handlers are used to handle all the block segments, whereas the computational resources required by the transaction handler function might be sufficiently high so as to require that each such handler manage the transactions for a smaller number of segments than their associated segment handler 604.

The transaction handler function plays another important role in the system as also previously described, namely, transaction admissions (also referred to as "validation") and propagation. A transaction handler 609 receives transactions in messages (via 612) from the edge either directly or indirectly via other transaction handlers in the network. The transaction handler 609 validates all received transactions and if valid, saves the transactions to a pool of unprocessed transactions (its mem pool) and optionally propagates the transactions to other nodes in the network in messages (via 613). In this way, the transaction handler function orchestrates the propagation of transaction data such that all nodes receive all incoming transactions and associated incoming transaction digests in a timely and efficient manner.

UTXO Handling

Preferably, UTXOs are identified by an identifier (txid), which is a hash or digest of the originating transaction, and the index of the output in the originating transaction. A UTXO also has two other pieces of information (not used in its identification), namely, a value, and a "locking script." Generally, the locking script is a set of instructions or simply a public key associated with the output. Sometimes the public key is called an address or wallet address. The locking script (e.g., the public key) is conveyed in the output of a transaction along with the value, and typically it is stored in a UTXO database along with the UTXO identifying information and its value. Thus, a query to the UTXO handler during initial transaction validation returns both the value and the locking script (public key). To spend a UTXO as an input to a new transaction, the new transaction (essentially its outputs), must be signed by the private key cryptographically matching the public key of the UTXO to be spent. This signature is provided with each transaction input and is generally called the "unlocking script." The unlocking script can be a set of instructions or simply a digital signature. Thus, the digital signatures bind the output values of the transaction to the locking scripts (public keys) for which the receivers of the values presumably have the corresponding private key (later used to formulate an unlocking script). The signature verifier does not have the private key (as only the wallet or cryptographic element thereof has the private key). The signature verifier receives the public key (from the locking script) and a signature (from the unlocking script), and the signature verifier verifies the signature against the public key, thereby proving the signature was produced by the matching private key. To summarize, a transaction output at a given index has a locking script (public key) and value. A transaction input has the originating txid, index, and an unlocking script (signature).

To handle transactions, and as noted above, the transaction handler interacts with a set of UTXO handlers 614 with messages (via 615 and 620) to create, query, spend, and assign Unspent Transaction Outputs (UTXOs) associated with each transaction. Each UTXO operation may also be reversed using an undo request in messages (via 620). This reversibility is valuable because it allows for a transaction handler 609 to undo the parts of transactions that may have completed successfully when the transaction as a whole fails to complete. Instead of locking UTXO databases to allow concurrency and prevent conflicts, here the system preferably relies on detecting conflicts and reversing UTXO operations for partially complete transactions. Conflicts in this context include, but are not limited to, an attempt to spend a UTXO before it exists or is finalized (as policy may dictate), spending a UTXO that has already been spent by another transaction, or any other UTXO operation failure that renders the transaction incomplete.

As noted above, each UTXO has a value and an locking script that must be executed successfully for the transaction to validate. The script is a set of instructions that must be executed to lock the use of a UTXO as an input to another transaction. Commonly, the script contains public key material that corresponds to the private key that must be used to sign transactions that consume the UTXO as an input.

Because the number of UTXOs that accumulate can grow large, the UTXO space preferably is also partitioned by transaction identifier in a manner similar to how blocks are segmented by transaction identifier, although preferably the partitioning and segmentation spaces are divided according the needs of each independently. While UTXO handling could be performed by the transaction handlers that produce the UTXOs, preferably the handling of UTXOs is separated out from transaction handling for two reasons: (1) because the resource demands are different, and (2) because isolating the transaction handler function enables the transaction and UTXO handlers to perform more efficiently. Preferably, the UTXO space also is partitioned to make more efficient use of a node's aggregate memory and storage resources. By applying this segmentation (namely, through the transaction segmentation space), a highly scalable and timing-constrained solution is provided.

Signature Verification

The final element in the block diagram in FIG. 6A is the signature verifier function provided by a set of signature verifiers 617. As noted above, preferably transactions are signed by the set of private keys associated with the transaction's inputs. The most compute intensive task in a node is verifying the signatures of a transaction. Consequently, significant computational resources preferably are dedicated to signature verification. Each signature verifier 617 preferably harnesses the computational resources necessary to support a portion of the signature verification load, and the transaction handler function disperses the signature verification load across the available set of signature verifiers 617 using messages (via 618) to send the data to be validated, and in return receiving acknowledgement or negative acknowledgement in messages (via 619). In one embodiment, these operations are carried out by combining signature verification with some other processing (e.g., transaction handling). In another embodiment, and as depicted and described, to allow for greater scalability, the processing demand is accommodated by enabling signature verifiers 617 separate from other elements.

Pipelined Block Generation, Transmission, and Verification

Figure 7:
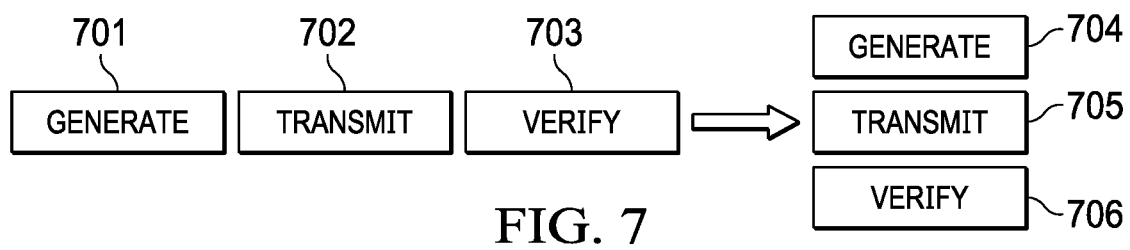
FIG. 7 is a high level depiction of a concurrent processing technique of this disclosure.

Referring to FIG. 7, traditional blockchain based systems serialize the generation (mining), transmission, and verification of blocks. In such systems, a block is generated 701 by a miner; once the block is finished being generated, it is transmitted 702 to other nodes for verification, and once nodes finish receiving a block, they begin to verify 703 the block. Such serial-based processing is inefficient and does not scale, especially in the operating context previously described, namely, wherein transaction messages are being generated across a potentially global-based network.

When attempting to build a system with high performance requirements, e.g., such as being capable of processing millions of real-time transactions per second, such current implementation approaches are entirely inadequate. For this reason, in the approach herein (and as described above), preferably these processing stages are pipelined for concurrency. Thus, according to the techniques herein, while a miner generates 704 block data, previously-generated block data is transmitted 705 to nodes for verification. The verifying nodes receive the mined block data and begin verifying 706 the block's transactions before receiving the complete block and likely long before the miner has finished mining the block.

It should be appreciated that in accordance with FIG. 5, the pipeline of block generation, transmission and verification also is instantiated for each segment of a block and that, as such, block segments are operated on in parallel. The result is greater concurrency through the combination of parallel and pipeline processing.

Streaming Block Generation, Transmission, and Validation

Figure 8:
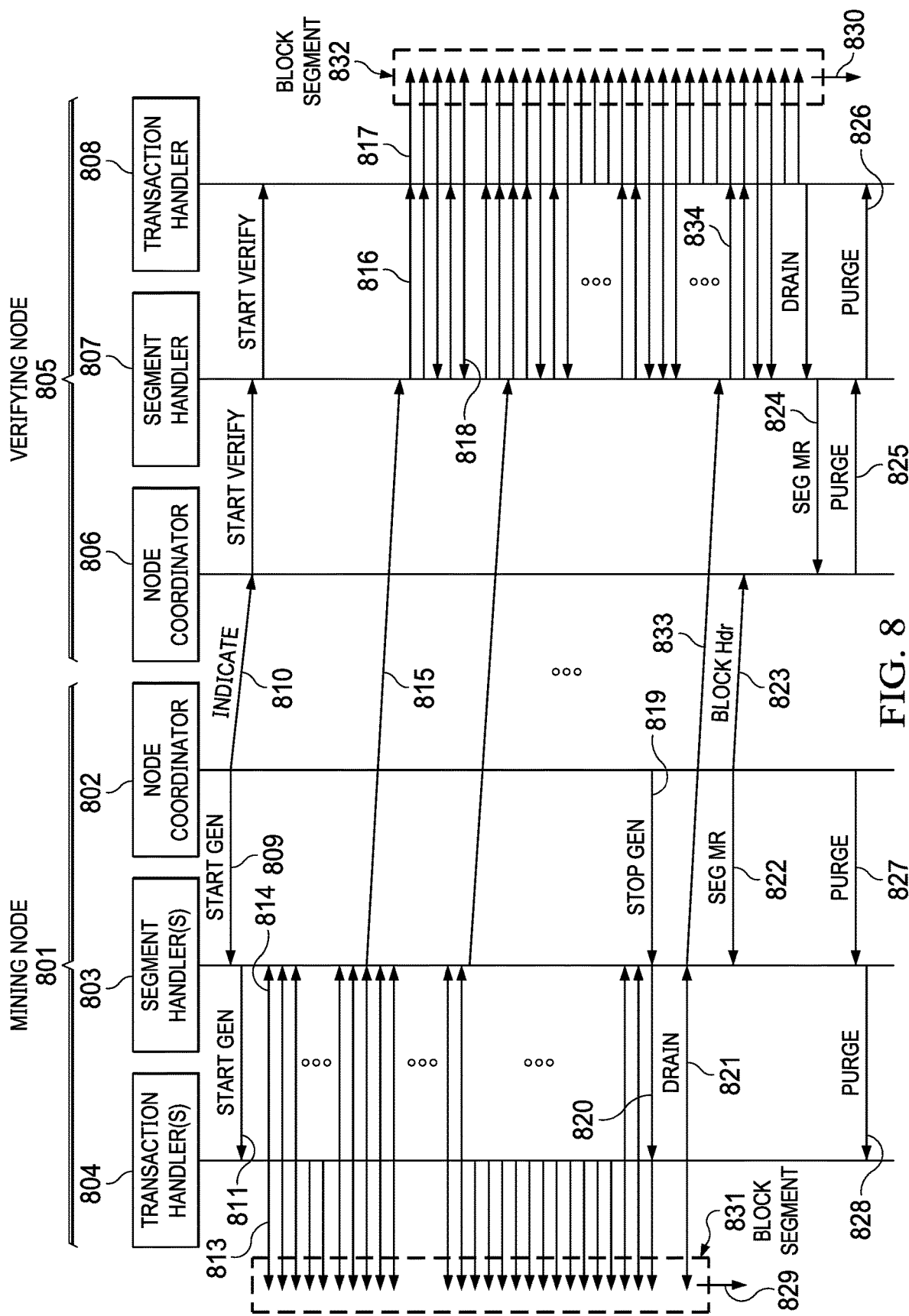
FIG. 8 is a detailed depiction of the operations that are carried out among various nodes and node elements to provide streaming block generation, transmission and validation according to this disclosure.

Referring to FIG. 8, to support pipelined block generation, transmission and verification a streamed block segment generation, transmission and verification process is shown between two nodes, namely: miner node 801 and verifying node 805. Although one verifying node 805 is shown, as described above typically all nodes in the network verify the mined block. As has also been described, this process also typically runs concurrently with the same process for other block segments being mined by miner node 801. As noted, there may be multiple miner nodes 801 and multiple streamed generation, transmission and validation processes operating in the network concurrently. Note that in this example, the responsibility of staging a segment for persistence is associated with the transaction handlers as opposed to the segment handlers, as described previously.

Generation

As shown in FIG. 8, the process starts when mining node coordinator 802 meets the criteria for mining a block on the network. In one embodiment, this criterion could be a probability condition that the miner can prove it meets (e.g., a trusted or otherwise verifiable random number below some threshold). Any criteria for miner selection (leader election) may be applied. Node coordinator 802 sends messages 809 to request that mining node segment handler 803 start generating block segments. Node coordinator 802 also sends messages 810 indicating to the validating node's coordinator 806 to expect mined block segments from the miner node's segment handler 803. Each mining segment handler 803 sends message 811 to their associated transaction handler(s) 804 indicating that transaction handler(s) 804 start assigning transactions from a pool of collected raw transactions associated with each transaction handler 804 to a block. Transaction handler 804 repeatedly inspects unprocessed transactions (transactions that have not previously been assigned to the block or any ancestor thereof.) that it received from the edge (directly or via transaction handlers in other nodes). It should be appreciated that some aspects of transaction verification (transaction validation as described above) may be done in advance when the transaction is first received. For each verified transaction assignment, transaction handler 804 (1) adds the full transaction record 813 to block segment 831, and (2) sends message 814 containing a digest (e.g., a hash) in a stream to segment handler(s) 803.

Transmission

Segment handler 803 collects one or more transaction digests from the stream of messages 814 and sends the transaction digests in a stream of messages 815 to the segment handler 807 in each validating node 805 responsible for validating the generated segment data. As shown, the number of messages in the stream of messages 814 may differ from the number of messages in the stream of messages 815, though the total number of transaction digests transmitted in both streams typically will be the same.

In validating node 805, segment handler 807 receives a stream of messages 815, extracts the transaction digests, and sends one or more messages 816 to transaction handler 808. The number of messages comprising the streams of messages 815 and 816 may differ. In this embodiment, transmitted message 810, stream of messages 815 ending with message 833, and message 823, may be transmitted unicast or multicast, directly from node element to node element, indirectly propagated through elements in other nodes, or routed or forwarded through network elements. The data may travel aggregated or separated.

Verification

Verifying transaction handler 808 receives the transaction digests and lookups unprocessed transactions it has received from the edge (directly of via transaction coordinator in other nodes). If the lookup is successful, it verifies the transaction assignment. Upon successful verification, transaction handler 808 (1) sends verification acknowledgements in messages 818 to segment handler 807, and (2) adds the full transaction record 817 to block segment 832.

End of Stream Handling

In one embodiment, the streaming generation, transmission, and verification process ends when mining node coordinator 802 sends a stop generation message 819 to all mining segment handlers 803. In this scenario, nodes are assumed to be running asynchronously, and with no explicit time boundary between execution rounds. In another embodiment, nodes may run in a synchronous manner, and the process would end when a specific time is reached. When the process ends, each segment handler 803 sends a stop generation message 820 to its associated transaction handler 804. Each transaction handler 804 finishes or aborts any transaction assignments that are still in progress and acknowledges that it has stopped mining along with any remaining assigned transactions included in the block segment in message 821 to segment handler 803.

Segment handler 803 sends any unsent transaction hashes and an end-of-stream indication in message 833 to validating node's segment handler 807. Each segment handler 803 computes a Merkle tree from the transaction hashes of each segment and sends the Merkle tree root (Merkle root or MR) to the node coordinator 802 in message 822. When the node coordinator 802 receives a Merkle root for all segments of the block, it computes the top of the Merkle tree for the overall block from the segment Merkle roots and generates a block header composed a hash of the previous block header, its mining proof, and the overall block Merkle root, and other data. On failure, node coordinator 802 send purge message 827 to each segment handler 803 which in turn sends a purge message 828 to its associated transaction handler(s) 804 that then discards the block segment. On success, node coordinator 802 sends the block header in messages 823 to all validating node coordinators 806.

When each verifying node's segment handlers 807 receives end-of-stream indications in messages 833, they in turn send to their associated transaction handlers 808 messages 834 indicating the end-of-stream verification. When each segment handler 807 has received acknowledgements for all outstanding transaction assignment verifications from its associated transaction coordinator 808, it computes the Merkle trees for its segments and sends the Merkle root for each segment in messages 824 to verifying node coordinator 806. When verifying node coordinator receives Merkle roots for each segment, it generates a block header, and verifies that the block header it generates matches the block header it received in message 823. If the block header does not match, it sends purge message 825 to each validating segment handler 807 which, in turn, sends purge message 826 to its associated transaction handler(s) 808 that then discards the block segment.

Finalizing a Block

As noted above, in the above-described system a block is not persisted until it is finalized. Preferably, the block is not finalized until the node coordinator concludes that is should be finalized based on having adhered to a prescribed consensus algorithm. In contrast, preferably at the conclusion of mining, a block is not persisted. Rather, after mining, a block is simply tracked until it is either finalized (per the consensus algorithm) or thrown away (purged), in the latter case because it did not survive the application of the consensus algorithm.

Thus, and as described, the approach herein leverages a high-quality, low-latency, highly-interconnected core network (the mesh) in conjunction with block segmentation and other above-described features (e.g., topology-aware data propagation, non-blocking architecture, optimistic concurrency control, partitioning, multicast and the other features) to provide a computationally-efficient transaction processing system, all without any central transaction routing or switching (e.g., a Layer 7 switch that needs to account for an route large numbers of transactions). Preferably, the architecture is used in conjunction with a global CDN network to provide global reach, and this approach advantageously enables CDN mapping technologies to be conveniently leveraged (e.g., by clients and other transaction services) to discover and interact with the computing elements in the core network.

Cryptographic Server Support

Another aspect of a distributed system of record as has been described involves constructing a permissioned network environment that enables high performance, as well as the high level of safety, security, and trust necessary for use in commercial applications. Unlike the non-permissioned open Internet, various elements of the system preferably rely on Public Key Infrastructure (PKI), for example, to establish chains of trust, trust boundaries, secure administrative features, as well as driving certain aspects of consensus, leader election, fork prevention and suppression, and so forth.

As described above, in the above-described overlay network-based design, the peripheral, edge and core elements preferably communicate with one another via mutually-authenticated encrypted connections. In this environment, it is desirable to prevent exfiltration and exploitation of the keys used to establish such connections. Further, and as also described, computing nodes in the core network typically have one or more public/private key pairs that are used to validate the authenticity of nodes that are generating (mining) a block. Further, nodes that are validating generated blocks typically use their keys to endorse the validity of a block by signing it. In a typical operating environment, public/private key pairs are also used to create a random number sequence that is in turn used to select miners and/or potentially to select a subset of miners and prune multiple pre-finalized chains. In all of these cases, any compromise of private keys creates potential security concerns. Moreover, and with respect to a consensus-based core network (such as has been described above), correctness is assured with up to some number of compromised nodes; thus, protecting private keys and verifying the data enabling their use provides defense-in-depth and mitigation against widespread network compromise. Indeed, for trusted computing environments involving wallets, protecting the private keys and verifying the data enabling their use (as will be described below) provides a first line of defense against both physical- and network-based compromises. To mitigate the risk of key compromise, preferably a secure server-based technology (sometimes referred to herein as "cryptoserver" (CS)) is used to equip the various parts of the distributed system of record with one or more cryptographic support services (or "crypto service") such that private keys and the logic enabling their use are segregated from periphery, edge and core service execution environments. By design, a crypto service provides a high security profile specifically used to keeping private keys private and safe from exploitation.

Thus, in one aspect, the a crypto service such as described may be used to protect wallet private keys. For example, a transaction may start of with a payee wallet providing to a payer wallet an amount together with a public key. The payer wallet does not possess the private key. Instead, preferably the payee wallet possesses an information associated with a private key, which is maintained by the crypto service. In response, the payer wallet sends a request to the crypto service, preferably using secure and mutually-authenticated communications. The request preferably contains data including information associated with the private key, together with the transaction data (or a digest or hash of the transaction data) to be signed. The crypto service verifies the transaction data and associated private key information and performs the signature over the provided data (or a portion thereof), and it returns the signature in response. The signed transaction is added to the system of record. In a representative use case, the data sent from the payee wallet to the payer wallet could be any data including, without limitation, a legacy ISO-8583 message, other payment or transaction API message new or extant, pass codes, pins, and so forth. An advantage of this approach is that while the interfaces to the payer wallet may be public and evolving, the interface between the payer wallet and the crypto service remains private and stable, making it far less vulnerable as an attack surface. A further advantage of using the crypto service is that it enables the data provided to the payer wallet to be used to construct transactions to be posted to the ledger; moreover, with both the original data and the constructed transaction sent to the crypto service, the approach enables verification (by the crypto service) of the original data, as well as verification that the constructed transaction is a correct representation thereof.

There are many variants in the above arrangement. For example, the crypto service may be accessible via a network, but it may also reside on the same machine or device in a segregated and protected (and possibly encrypted) memory space such as a secure enclave. Further, a single crypto service, or as small set of crypto service(s) may be used to protect the keys of multiple (and potentially a large number of) wallets.

The crypto service may also be used to protect private keys used for block generation (mining) and validation. In this aspect, block generation and validation activities are augmented with Public Key Infrastructure (PKI), such that blocks are not simply validated by their content, but they are also validated by the authenticity of the mining node. Thus, for example, assume that a miner is generating a block (or portion thereof) as has been described. As noted, typicaly the header for a block includes a variety of information, such as a hash of the previous block upon which the block depends. In addition to the usual information included in a block header, the system can require that the block be signed by the node that mines it. In such context, it is important that the private key or keys used for such purposes remain secure. To this end, a crypto service mitigates the risk of private key exfiltration and exploitation by keeping such keys segregated from application and service logic. In this context, the material being verified and signed by the miner could be anything including, without limitation, block attributes, any other data contained in the block, the state of the system at the time of generation, the signature contained in the previously-mined block, and so forth.

Preferably, trusted computing environments are used to provide the crypto service(s). In one implementation embodiment, a crypto service (or crypto server) typically comprises a networked security appliance attached to each transaction network server (e.g., a wallet services multi-wallet processor) that interoperates seamlessly with a key management system associated with the transaction network.

A representative crypto service is as described in U.S. Pat. No. 9,647,835, the disclosure of which is incorporated herein by reference. As described there, a representative server-side (the crypto server (CS)) process runs in an execution environment that has physical security and that is distinct from the execution environment of an overlay network edge server. A crypto server daemon is responsible for managing incoming requests from the network reporting load, and generating log and related information. The secrets (e.g., private keys) protected by this trusted computing environment are maintained secure, e.g., by being stored in trusted hardware that is only accessible by the daemon. A trusted computing environment of this type may leverage Hardware Security Modules ("HSMs" or enclaves), such as supported by Intel® SGX (Software Guard Extensions) or attached preferably programmable HSMs. In a representative embodiment, a crypto service executes in a caged network setup, with private keys (or other secrets) protected by an enclave. An enclave typically is statically-compiled and requires BIOS and kernel support, and preferably an enclave does not and cannot interact with any hardware or software that is not co-located (on-die). Although the above-described components are preferred, any memory-encrypted trusted computing element may be used for these purposes.

Crypto service(s) may comprise a network-based service that includes hundreds or even thousands of crypto servers, each handling large numbers of transactions. Preferably, a computing node of the system has associated therewith a trusted computing environment as described. More generally, secure (trusted) services are built on top of components, even in the operating scenario (as described) where no one or even a small set of components are themselves trusted. In particular, and as described, the computing nodes of a blockchain network do not need to trust one another, and in general, wallets do not trust the ledger in so far as they require cryptographic proof that the ledger is valid and that transactions are on the ledger. Preferably, transactions on the ledger are signed individually for each transaction input and are therefore self-verifiable; in other words, the ledger can be trusted without necessarily trusting the computing nodes that provide the ledger services.

A blockchain consensus process relies on mining, which as referenced above is the act of generating an ordered block of transactions, typically with a header that references a previous block in the blockchain.

As described, the distributed system of record provides for a permissioned, highly-secure computing environment comprising a set of computing nodes. For mining, a mining proof is data presented by a computing node that mathematically proves the node is a legitimate miner of a block or portion thereof. The data preferably is recorded in a block header such that proper blockchain construction (namely, trust), is self-verifiable. According to one approach, mining proof is provided, preferably using some available source of trusted random numbers. In such an approach, preferably a node uses a memory-encrypted trusted computing element to generate real random numbers to facilitate producing mining proofs that exhibit the properties desired.

The following is a glossary of terms used herein.

A blockchain is an append-only immutable chain of data blocks, wherein the presence of a transaction recorded within a block, and a block within the chain, are verifiable via cryptographic hashes. A block is a collection of transactions. It contains a cryptographic hash linking it to a previous block, forming a chain. Multiple blocks can be linked to a previous block, but only one finalized block can be linked to a previous block.

A merchant is an entity that executes a trade of goods or services for payment. A merchant has a bank account that is managed by an acquiring bank, and typically it maintains point-of-sale terminals (or other legacy infrastructure) responsible for generating valid payment requests. More generally, a point-of-sale terminal is a type of merchant connection module (CM) that generates payment requests.

A wallet is a collection of private-public key pairs and reference to unspent transaction outputs, which are "stored value," and that are used to create transactions. A "wallet service" typically is a software entity that securely maintains a collection of wallets, proxies requests between external entities and a core network of computing nodes that support the blockchain, and that process the corresponding reesponses.

A wallet service may utilize a multiple wallet processor (WP) or equivalent processing function.

As described above, an Unspent Transaction Output (UTXO) is an output from a finalized transaction that contains some value and that is associated with an address. UTXOs can be passed as an input (spent) to a transaction that is created by a wallet holding the associated private key. A UTXO can only be spent once.

An acquirer is an institution where a bank account is held. An acquirer typically operates legacy infrastructure that is responsible for authorizing payment requests. This infrastructure is sometimes referred to connection module for an acquirer or an operator.

A business server is a service external to the payment network that provides one or more services, such as clearing, operator and merchant bank processes, regulatory compliance, and the like.

A ledger service (sometimes referred to as "ledger services") is a distributed system that processes transactions and maintain a core ledger. The core ledger is the system of record maintained by the ledger service utilizing the blockchain technology described herein. The core ledger is a distributed system that processes transactions and creates the blockchain.

A payment network is a network that combines wallet services and the blockchain core ledger (ledger service). Wallet services receives client transactions, routes the transactions to a wallet processor (e.g., a WP), applies the necessary payment logic, and then forwards valid transactions to the ledger services. Ledger services, in turn, receives transactions from the wallet services, validates, processes, and records them onto the blockchain-based ledger. Processed transactions, consisting of the original legacy transaction and its corresponding blockchain transaction from ledger services, may be stored in a storage services for long-term persistence. The storage system may be used to respond to historical queries, and to provide backup for disaster recovery. A payment network may also include a data cooperation service to provide an interface to handle administrative traffic. Customer transactions enter the system via wallet services, while administrative requests (wallet updates, data center updates, historical queries, etc.) enter the system via the data cooperation service, which validates requests before forwarding them to the correct service. Preferably, the data cooperation service exposes a set of RESTful application programming interface (API) endpoints and, as a result, supports any client that can make a TLS mutually-authenticated REST-based HTTP request and send data represented by JSON.

Figure 11:
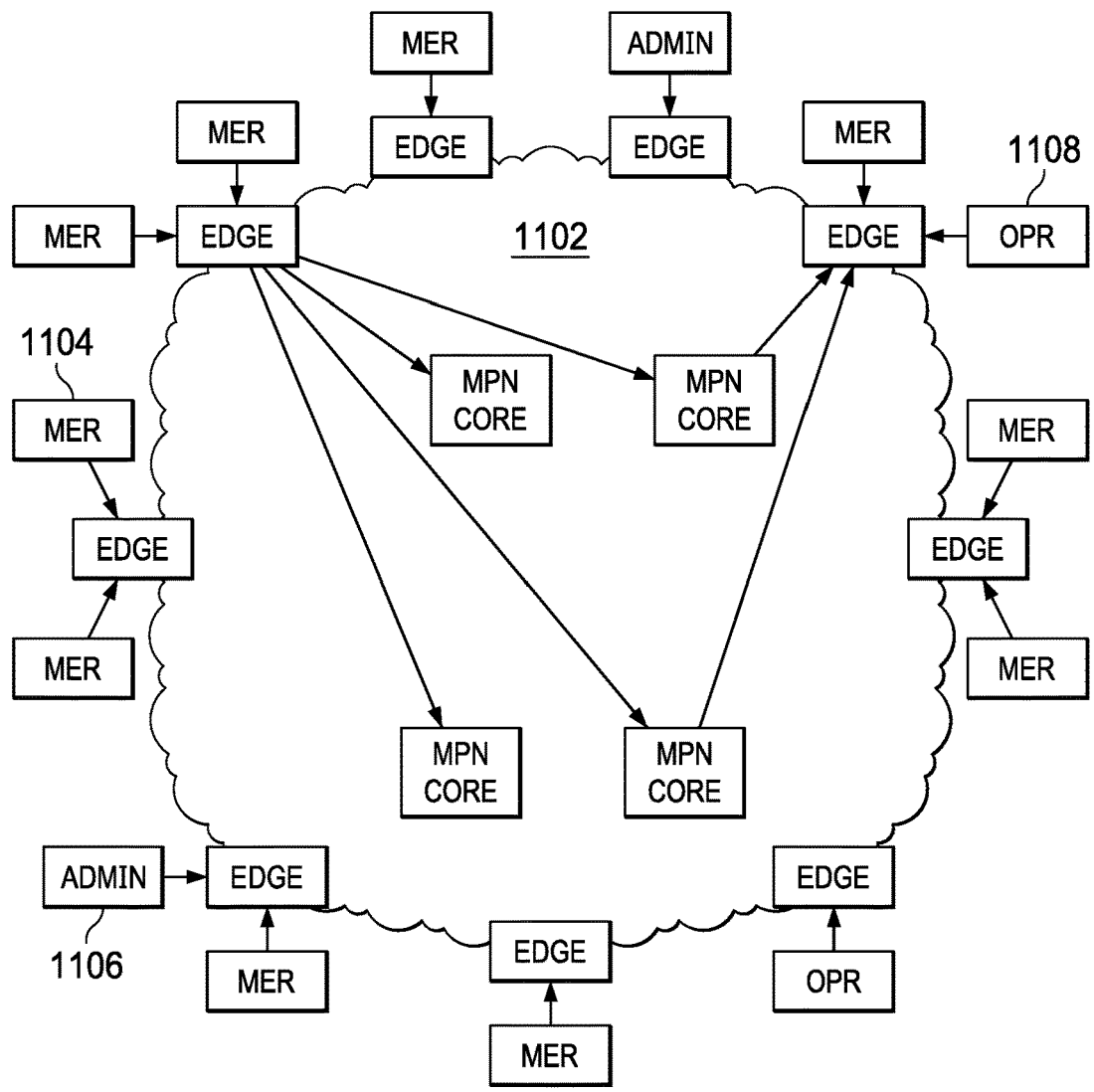
FIG. 11 depicts a block diagram of a payment network core surrounded by an overlay network edge network.

With reference to the above-described terms, FIG. 11 is another depiction of a representative system in which the overlay network edge servers 1100 act an entry point(s) for requests entering the payment network core 1102, either from merchant connectors (MER) 1104 or from administrative servers 1106; optionally, the edge acts as the entry point for requests sent to acquirer/operator-based connectors (OPR) 1108 from the payment network core 1102. As previously described, among other performance benefits, the overlay network provides for routing optimization, attack resilience, rate limiting and client authentication prior to requests being forwarded toward the payment network core nodes. By isolating the core nodes in this manner, the overlay network provides resilience for a variety of attacks as well as mitigation for various types of localized Internet problems. As depicted, the overlay network edge effectively surrounds the payment network core, allowing other components (such as the merchant connector) to connect through it to reach the payment network core services. The vast scale of the edge network allows the payment network to scale linearly with workload, using the edge to balance traffic between the appropriate payment network core nodes.

The edge provides protection from Internet-scale attacks, blocking non-authenticated requests from reaching payment network core and blocking connections that fail to meet mutual authentication requirements. The edge also protects against non-HTTP-based DDoS traffic, such as SYN and UDP floods. Additionally, the edge provides enhanced performance and reliability. Preferably, TLS and TCP connections are terminated close to the merchant connector to provide performance gains. Connection pooling from the edge to the payment network core reduces the overhead of TLS negotiation. Preferably, each edge node can communicate with any payment network core node, routing location-specific requests to the proper location. This optimized routing preferably avoids payment network core locations that are heavily-located or undergoing maintenance. Preferably, the administrative server and the merchant connector connect to the edge using the same protocols and methods, as does an acquirer connector. Payment network core services connect to the edge as client and may be routed to an acquirer connector server.

Preferably, all HTTPS requests to the payment network core are first sent to the edge, where TLS is terminated and the client's identity verified. The merchant MERs and administrative server clients preferably connect to the payment network core using configured domain names.

The following sections describe in detail representative connection flows among clients, the edge, and the payment network core.

Figure 12:
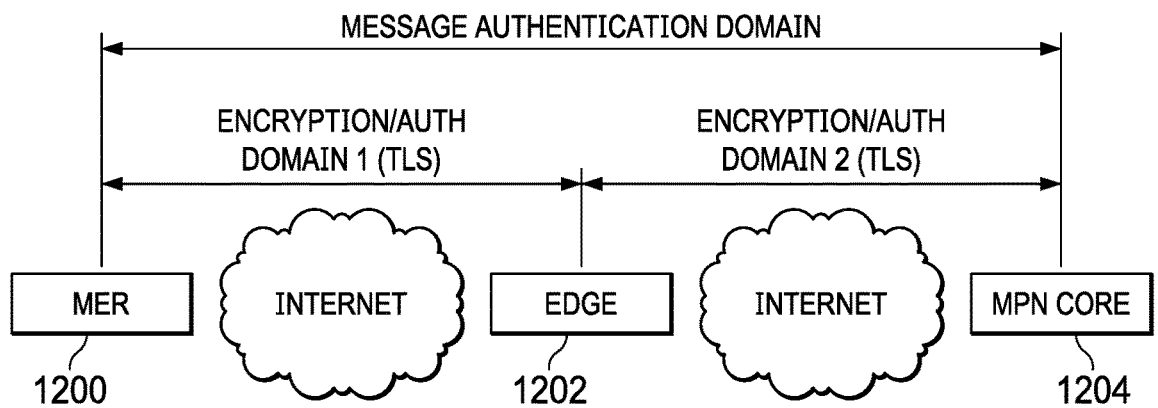
FIG. 12 depicts end-to-end connectivity among a merchant connection module, an edge server network, and core elements of a blockchain-based distributed system of record.

Preferably, a merchant connector and its downstream components (e.g., POS terminals and cards) are physically and electronically secure. As depicted in FIG. 12, a merchant connector 1200 is coupled to the overlay network edge 1202 by resolution of a DNS lookup (to a managed hostname), thereby resulting in one or more edge IP addresses corresponding to edge servers. These servers preferably are close to the merchant connector 1200 from an Internet topology standpoint and use standard mutually-authenticated TLS-encrypted HTTP calls using port 443 over the Internet. From edge 1202 to the payment network core 1204, preferably the overlay network controls the connection flows and is responsible for their privacy and authenticity. Preferably, the edge 1202 is very diversely deployed across multiple ISPs and geographics, while typically the payment network core 1204 is deployed on a smaller geographic scale (e.g., in highly-secure locations that communicatioe with the edge 1202 via the Internet). Traffic between the edge and the core preferably is encrypted, authenticated, and authorized. In particular, preferably all messaging is encrypted in transit using TLS-based mutually-authenticated connections. As depicted, the message authenticatino domain preferably is end-to-end so as to protect against any compromised man-in-the-middle (MITM) element from forging messages. This ensures that any message the payment network core receives can be verified as hying been signed by keys that have never been by any payment network core systems or personnel. The corresponding assertion preferably is also made for all messages merchant connectors receive from the payment network core.

Preferably, the overlay network edge is used to couple the payment network core (acting as a client) to the acquirer/operator OPR 1108 (FIG. 11), or to couple an administrative server 1106 to the payment network core.

Use Cases

The above describes a high performance core distributed ledger and transaction fabric for use, for example (but without limitation), in a payment network. Transactions are not limited to the primitive of moving value of sources to destinations, but rather any processing involving the transformation, conversion or transfer of value or information. The performance core provides the foundation to support a myriad of use cases including, without limitation, high performance transaction processing to financial systems.

As used herein, processing time is defined as the time elapsed between when an operation request (e.g., a financial operation request) is received and when a response is available. A particular operation may require more than one transaction on the ledger. An operation is considered to be fully process when all required transactions have been securely stored in the ledger and all relevant business logic has been executed. Preferably, processing time is on the order a couple seconds, if not less (e.g., sub-second). In addition to maintaining processing time in this manner, the core network supports a high volume of operations. Operational throughput is defined as the rate at which operations are processed by the core network. A desired throughput may be up to $10^6$ (or higher) operations per second, although this is not a limitation.

In one embodiment, the above-described architecture provides a distributed ledger, namely, a financial message ledger. The ledger provides an immortal log of transactions, secured with blockchain technologies as described. When used in this context, the network includes the ability to interface with existing financial transaction systems, forwarding requests to and response from an acquirer (ACQ) and/or issuer (ISS). An alternative use case is a managed-value ledger, which enables the processing of transactions against a managed line of credit (or debit). This use case enables an ACQ/ISS to provision an on-network account balance that is subsequently credited/debited against without contact with the ACQ/ISS. Transactions that exceed the managed credit line can trigger a fallback to querying the ACQ/ISS to request approval. In a typical use, the transaction flow is as follows. A message is assumed to be approximately 1 KB in size. That message is received by the edge and distributed (from there) across the core blockchain network. After the transaction is finalized (and a blockchain receipt is received), a response is sent from the edge. In total, the maximum round trip time is preferably on the order of no more than two (2) seconds. In addition, the payment network is able to handle an end-of-day batch clearing process where an additional 1 KB message for every processed transaction is sent of the payment network for clearing. These batched transactions is expected to be processed and logged within a few hours.

Any other use case requiring processing of transactions at a high rate and with low latency may benefit from this architecture. The management of loyalty points is one non-limiting example of a non-monetary application.

The architecture herein is also highly secure. Encryption, authentication, digital signatures and other technologies are used to guarantee customer privacy and data integrity.

The techniques herein provide for a global system of record that exhibits high performance (in terms of number of transactions processed) and very low latency, all without sacrificing data security.

The managed network herein is a highly secure permissioned network. Accordingly, transaction collection and block construction times are reduced to near the time it takes to propagate a block across the network. The approach herein takes advantage of the fact that network latencies are generally sub-second between arbitrarily remote locations on the Internet; further, these latencies are further reduced by using the highly dispersed edge periphery and a less dispersed core in the manner that has been described.

The architecture described is highly-performant and overcomes the many problems that exist in known blockchain network environments, namely, network latencies, network utilization, confirmation depth, clock skew, topological bottlenecks and other factors. To facilitate the solution, as noted above preferably the core network itself has good geographic and topologic proximity. This is desirable, as consensus protocols (such as are used in a blockchain network) often rely on large volume messaging. Preferably, depending on the consensus protocol used, the core network is to have low network latency and high interconnectivity, as this ensures that block propagation times remain timely with respect to the system's response time requirements. The overlay's secure edge network is leveraged to ensure a fully global payment network that is still highly-secure and high performance.

Blockchain systems include the concept of confirmations. Once a transaction is confirmed and added to a block in the blockchain, it is considered to have one confirmation. Each subsequent block added to the blockchain increase the level of confirmation of that transaction. The more confirmations a transaction has, the more difficult it is for the transaction to be removed from the blockchain. Most blockchain systems adopt a convention of waiting a certain number of confirmations until a transaction is considered finalized and durable; this is referred to as the "confirmation depth." Preferably, the solution herein utilizes a configurable or variable confirmation depth to support transaction resiliency requirements.

Computing nodes in the core are time-synchronized, preferably using a time server.

The core network may be configured as a non-blocking full mesh interconnect topology. One preferred approach implements the core network as a highly resilient partial mesh interconnect topology. To balance resilience (to network outages and attacks) versus block propagation times, however, preferably an efficient topology-aware data propagation protocol is implemented, as has been described. The protocol is preferably built upon a multicast protocol where orchestration is done in the network layer.

As used herein, a node is a high (upper) level unit of computing on the network. Typically, a node comprises one or more physical machines (servers) that handle the node's workload. Preferably, the implementation of a node is abstracted away from other nodes; to such other nodes each peer node appears as a single entity on the network. To support the transaction rate (e.g., one (1) million transactions per second), preferably the node is configured into multiple physical machines. As noted above, preferably a node also has a time server that is used to produce timestamps accurate to less than a millisecond. In addition, a node includes a cryptographic engine and random number generator (RNG) server that is used to produce signatures and entropy needed for consensus. Finally, the node includes transaction processing servers that are responsible for processing incoming transactions and appending them onto the blockchain in the manner described above.

In the permission-based approach as has been described herein, a node proves itself as a miner by providing a mining proof. A mining proof is data presented by a node that mathematically proves the node is a legitimate miner of a block (or segment thereof). The proof is recorded in the block header such that proper blockchain construction (namely, trust) is self-verifiable. Without intending to be limiting, a distributed verifiable random function (DVRF) may be used to facilitate the mining proof. Alternative approaches include use of hardware-generated trusted random numbers.

Enabling Technologies

Figure 9:
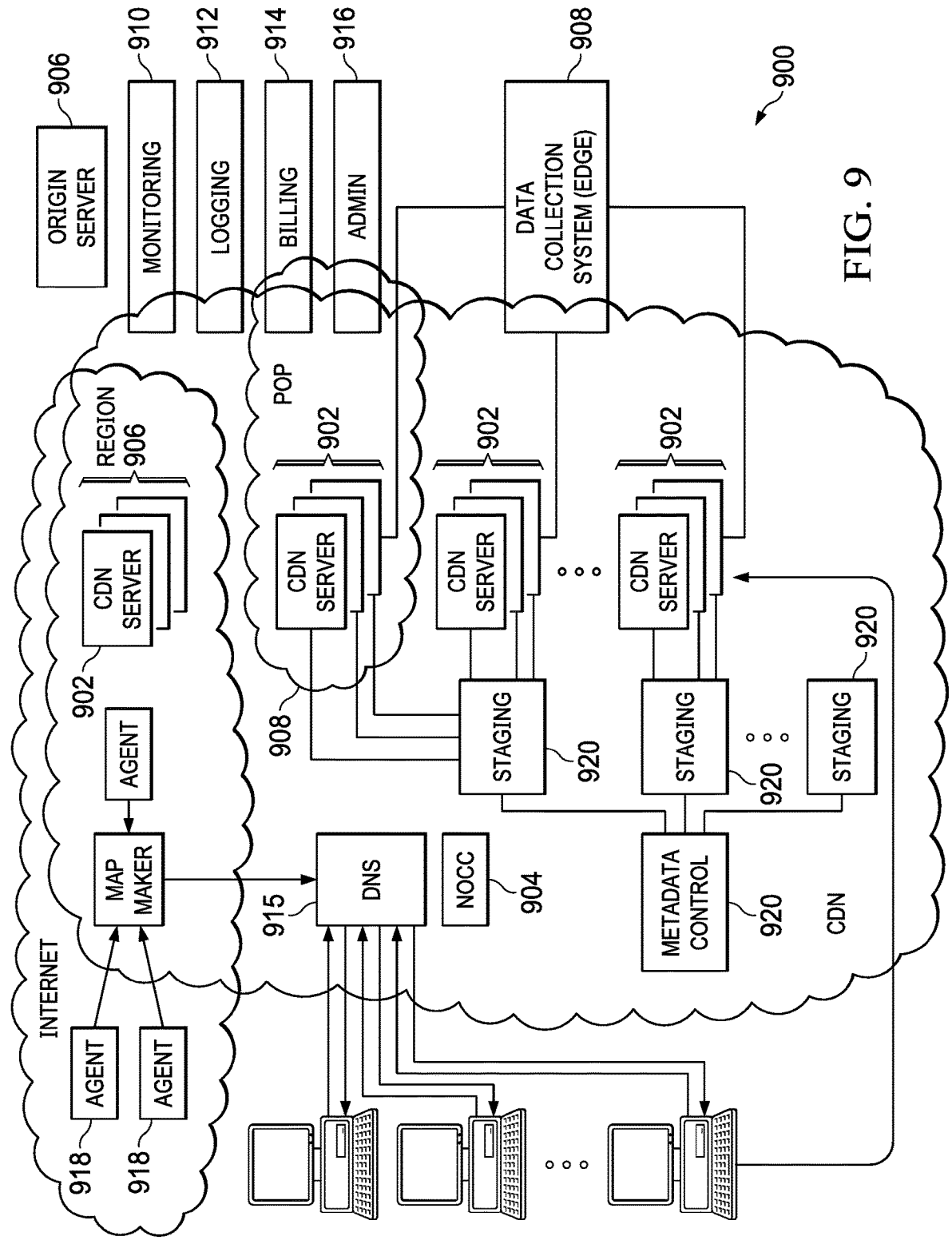
FIG. 9 depicts a content delivery network (CDN) architecture that may be associated with the computing network fabric.

As noted above, the techniques of this disclosure may be implemented within the context of an overlay network, such as a content delivery network (CDN), although this is not a limitation. In a known system of this type, such as shown in FIG. 9, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 10:
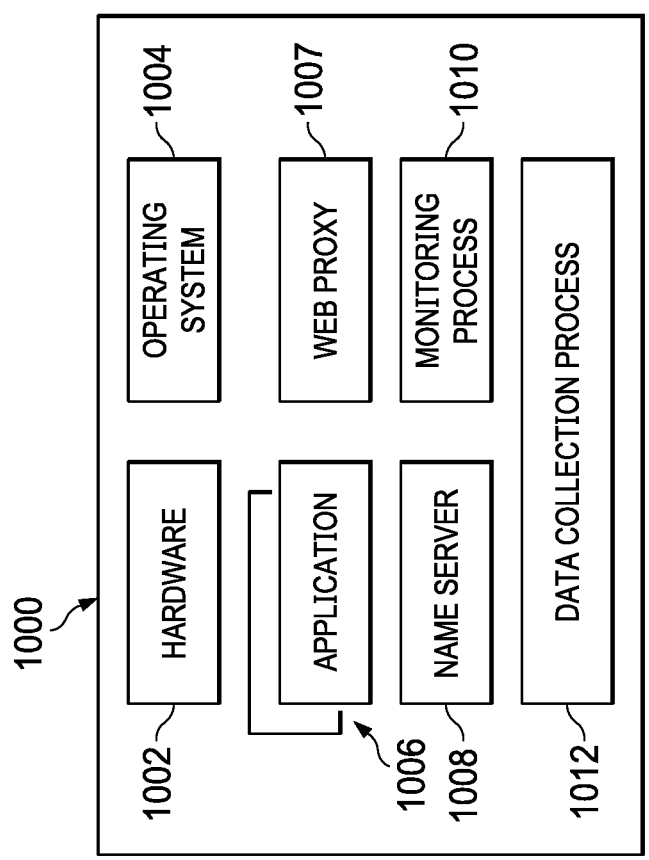
FIG. 10 depicts a representative machine configuration.

As illustrated in FIG. 10, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. The approach described there is sometimes referred to as an SSL-protected edge network. In a typical operating scenario, secure content delivery enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras, providing a key management service, and the like. In one embodiment here, wallet services may be located in front of or behind an SSL-protected edge network.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

The above-described client-to-edge server mapping technique may be used to associate a wallet or wallet service (the "client") with an edge server. In a typical use case, a transaction initiated from or otherwise associated with that wallet or wallet service then passes through the edge server and onward to the core for further processing as described herein. As noted above, the wallet or wallet service (or some portion thereof) may also reside inside the edge, such that wallet requests pass through the edge to the wallet or wallet service and onward to the core. Some portion of the transaction processing may be carried out at the edge server.

Each above-described process preferably is implemented in computer software as a set of program instructions executable in one or more processors, as a special-purpose machine.

Representative machines on which the subject matter herein is provided may be Intel hardware processor-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields.

Each above-described process preferably is implemented in computer software as a set of program instructions executable in one or more processors, as a special-purpose machine.

The edge network may communicate with the core using various technologies. Representative overlay network technologies that may be leveraged include those described in U.S. Publication Nos. 2015/0188943 and 2017/0195161, the disclosures of which are incorporated herein by reference. Among other things, these publications describe the CDN resources being used facilitate wide area network (WAN) acceleration services over the overlay in general, as well as between enterprise data centers (which may be privately-managed) and third party software-as-a-service (SaaS) providers. In one typical scenario, a so-called routing overlay leverages existing content delivery network (CDN) infrastructure to provide significant performance enhancements for any application that uses Internet Protocol (IP) as a transport protocol by routing around down links or finding a path with a smallest latency. Another approach is to provide messages from the edge to the core using multicast, unicast, broadcast or other packet-forwarding techniques.

The techniques herein generally provide for the above-described improvements to a technology or technical field, as well as the specific technological improvements to various fields including distributed networking, distributed transaction processing, wide area network-accessible transaction processing systems, high performance, low latency transaction processing systems, non-blocking full mesh interconnect systems, and the like, all as described above.

Consensus

Figure 13:
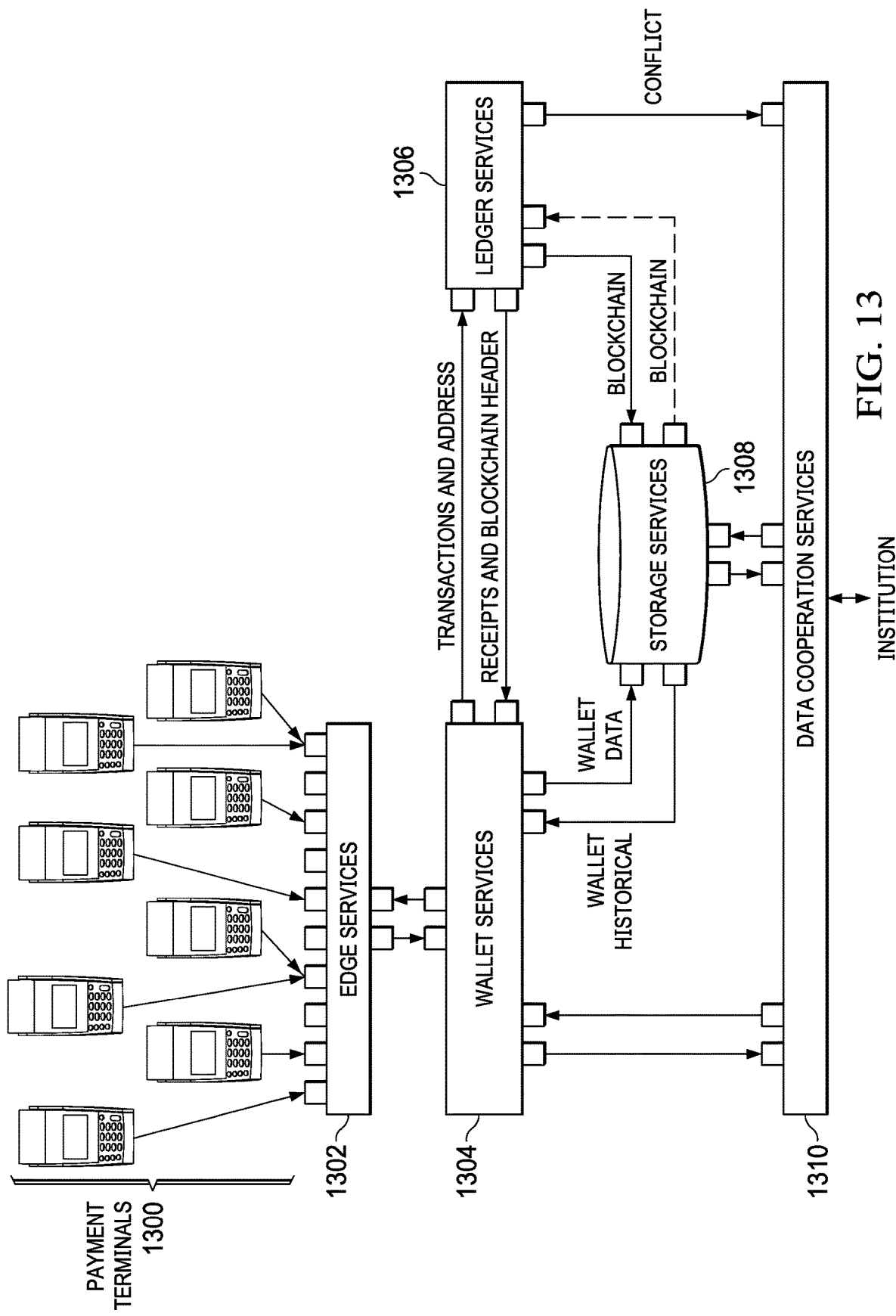
FIG. 13 depicts how the a distributed system of record system is integrated in association with legacy infrastructure.

A blockchain consensus process relies on mining, which as referenced above is the act of generating an ordered block of transactions, typically with a header that references a previous block in the blockchain. The technique may be implemented in the system shown in FIG. 13, wherein legacy infrastructure (payment terminals 1300) interface to a payment network via the overlay network's edge services 1302. In one embodiment, the payment network comprises wallet services 1304, ledger services 1306, storage services 1308, and data cooperation services 1310, the latter interfacing to an institution (such as a bank).

The following describes a design for a confidence-based consensus technique according to this disclosure.

System requirements preferably are as follows: consistency, availability, scalability and performance. Consistency is the notion of maintaining or regaining a single valid blockchain under a variety of conditions: overload, adversarial action, component failures, network partitions, and the like. Availability is the notion of maintaining the system's ability to continue functioning despite node failures and partial network outage. Scalability is the ability of the system to scale linearly as the number of transactions per second increase. Performance is the notion of achieve finalization within the ledger in under a given time.

Choosing One Leader

Preferably, only a single miner is elected each round. This eliminates both zero-miner rounds and excessive miner rounds, as well as a class of potential forks, and reduces the cost of the system.

Under the approach herein, a permissioned blockchain network provides information to wallets concerning the disposition of their transactions. Instead of a node halting until it receives a threshold of signature shares, each individual signature of a block preferably serves to add a degree of confidence to that block's transactions. A node signs each valid block it receives and propagates this signature data to other nodes as well as to wallets. This is called witnessing, as in a node bearing witness to the validity of a block. This signature data provides cryptographic evidence to other nodes and to wallets that can be interpreted as a score or confidence measure in the durability of transactions included in the block—as a wallet sees more nodes witness a block, it becomes more confident that the block's transactions will be finalized.

To reduce the cost of verifying block confidence, preferably a multi-signature cryptographic approach is used. Thus, a block's witness signatures are aggregated into a single signature that can be verified using a single public key that is the aggregate of the witnesses' public keys. This enables confidence to be represented preferably using a single signature and public key attached with a list identifying the witnesses. To verify a block's confidence, the verifier aggregates the witnesses' public keys, checks whether the resulting public key is the same as the confidence public key, and verifies the signature using that public key.

Using Confidence

Confidence data provides information to wallets about the degree to which the core network agrees upon the finalization of a block. This information may be used in a variety of ways. More generally, this is a mechanism for which policy or business logic can be defined and implemented on behalf of any institution (e.g., bank) and its customers. Moreover, preferably the conflict resolution options are implemented with a high degree of automation.

Confidence-Based Fork Resolution

Using confidence, the system can resolve forks, as follows.

First, if presented with two or more chains (a fork), the system adopts the chain with the greatest confidence. In the event of a tie (equivalent confidence), a deterministic tie-breaking strategy is applied.

Once the winning chain is chosen, the node recovers that chain in much the same way it would recover from a failure. Once recovery is complete, the node returns to verifying blocks generated by other nodes. Preferably, the node will not, however, return to generating its own blocks until transactions on the abandoned chain are reprocessed (revalidated and propagated).

Preferably, transactions from abandoned chains are revalidated as though they were received anew. If there has been a true network partition, most transactions should validate and get propagated to the rest of the converged network. If there has not been a real network partition, however, many if not all transactions will already be present on the winning chain and fail to validate because they are discovered to be duplicates.

Transactions that fail to revalidate, unless they are known to be duplicates, preferably are output from the ledger in the form of a conflicting transaction stream. The conflicting transaction stream is consumed by wallets where prescribed business logic can be applied and/or communicated externally so external business logic can adjust balances accordingly.

Block Intervals

Preferably, the consensus algorithm proceeds in fixed-length intervals (rounds) across a set of nodes with synchronized clocks, and where the communication delay between nodes is bounded. For simplicity, the following design assumes round duration remains constant.

Leader Selection

For any given round of consensus, preferably one and only one leader is selected. Preferably, the selection is made using a network global deterministic random number, preferably as revealed using a threshold signature. Using a threshold signature means that an adversary must compromise a threshold of nodes before it can gain foresight into what nodes will lead future rounds.

Witnessing

When presented with a block that verifies relative to a node's local chain, the node signs the block using its identity key and broadcast its signature. In so doing, the node is bearing witness to the validity of the block.

Confidence

The aggregate witness signature information for a block comprises its confidence and serves as a measure of durability of transactions included in the block. Confidence is communicated through the distribution of witness signatures either individually (during normal operation) or in aggregate form (during fork resolution).

Block Verification

When a node completes its verification of a block, it transmits the block header, the node's block witness signature, and the blockchain receipts for transactions associated with the block. In absence of further witness signatures, the block is said to have minimal confidence (a confidence of one) and is not considered final.

Block Finalization

Whereas block verification is an active process, block finalization (consensus) is a condition associated with block confidence exceeding a prescribed threshold. An observer that receives proof that block confidence exceeds the threshold can safely act knowing that the given block and all its ancestors, regardless of ancestor confidence, are finalized on the blockchain.

Allowing Forks

Forks are expected to occur only under rare circumstances, such as during a true network partition, but the system can be configured to allow forks in the blockchain. This feature maintains ledger services availability during even large outages such that the payment network can remain operational, although possibly in a degraded state, depending upon application of prevailing business logic.

Fork Resolution

Using block confidence, nodes automatically detect and resolve forks. Transactions that do not conflict over the use of UTXOs are automatically added to the main chain or discarded if they are duplicates. Conflicting transactions are reported to external elements to be resolved.

Terminology

Let $\lambda$ denote the number of transactions per second that the system can support.

Let T denote the maximum time allowed for the core ledger to finalize a transaction.

Let n denote the total number of nodes in the system.

Let f denote the number of malicious nodes the system can safely tolerate.

Let F≥f denote the total number of failed nodes the system can safely tolerate, including malicious nodes as well as those that have simply crashed.

Let $A_i$ denote the leader for round i.

If allowing l different leaders for a given round, label them $A_i^0, A_i^1, \ldots, A_i^l$.

Let $B_i$ denote the block mined in round i.

If allowing multiple leaders, let the block mined by leader j in round i be $B_i^j$.

Let $\bar{B}_i$ denote the header of block $B_i$.

Let $E_{B_i}$ denote the Network Epoch of block $B_i$.

A Network Epoch is a network configuration version number.

This is a monotonically increasing number that is incremented in each config block, so if $B_i$ is a config block then $E_{B_i} = E_{B_{i-1}} + 1$, and if $B_i$ is not a config block then $E_{B_i} = E_{B_{i-1}}$.

Preferably, he Network Epoch can only be changed by Admin, as every config block must contain an Admin signature.

Let $H:\{0,1\}^* \to \{0,1\}^c$ denote a collision resistant hash function for some whole number c.

This function is known to all nodes.

In practice, different components of the system may require separate hash functions $(H_0, H_1, \ldots)$ that produce outputs of different lengths.

Let $\beta_i$ denote a null block mined in round i.

Null blocks contain no transactions. The only values $\beta_i$ must include are i and $H(B_{i-1})$ (or $H(\beta_{i-1})$ when applicable).

For any round i, any two nodes j, j' that agree on $B_{i-1}$ must independently produce $\beta_i^j = \beta_i^{j'}$ without the need to communicate.

Let t denote the duration of a round.

Let $\tau_i$ denote the time at which round i begins.

This is also the time at which each node j calls Broadcast($\sigma_i^j$), distributing its leadership signature share for the round.

Assume that the initial round begins at time 0 so that each round i begins at time $\tau_i = t*i$.

Let $\delta$ denote the maximum time difference between the clocks of any two nodes.

Let $\Delta$ denote the maximum one-way network delay between any two nodes. This incorporates their clock skew $\delta$, such that a message sent by node j at its local time $\tau$ will arrive at node j' by its local time $\tau + \Delta$.

Let $\delta$ denote the time it takes to finish verifying a block after receiving all information pertaining to that block.

Let $0 \leq C_j(B_i) \leq 1$ denote node j's confidence in block $B_i$.

A given node's confidence in a given block is always monotonically increasing.

This is an internal metric calculated independently by each node. It is only communicated indirectly by transmitting received witnessing signatures, either individually or in the aggregate.

Let $\omega$ denote a finalization threshold, such that when $C_j(B_i) \geq \omega$ for at least one node j, then $B_i$ has been finalized.

A finalized block is eventually added (at the appropriate depth) to every honest node's chain and is nnot removed from any honest node's chain once that node recognizes that it has been finalized.

Only a single block may be finalized for each round.

Let S be an asymmetric cryptosystem that supports multi-signatures and provides the following functions:

$Gen_s(\ )$ outputs a public/private keypair {PK, SK}

When run by node j we denote these keys as $\{PK_j, SK_j\}$ $Sign_s(x, SK_j)$ outputs node j's signature of message x $Verify_s(x, \sigma, PK_j)$ outputs True if $\sigma$ is the output of $Sign_s(x, SK_j)$, in which case we write $\sigma = \sigma_x^j$. Otherwise it outputs False.

$AggregateKeys_s(\{PK_1, \ldots, PK_k\})$ outputs a compact aggregate public key $\widehat{PK}_{\{1\ldots k\}}$ specific to the set of k nodes whose public keys are input.

$AggregateSig_s(x, \{(\sigma_1, PK_1), \ldots, (\sigma_k, PK_k)\})$ outputs a compact aggregate signature $\hat{\sigma}$ such that $Verify_s(x, \hat{\sigma}, \widehat{PK}_{\{1\ldots k\}})$ outputs True if and only if $Verify_s(x, \sigma_i, PK_i)$ would output True for every $i \in \{1, \ldots, k\}$.

Let $\underline{S}$ be an (m,n)-threshold cryptosystem for some $n \geq m \geq f+1$ which includes the following functions:

$Gen_{\underline{s}}(E', \{PK_1, PK_n\}, m)$ generates (as in [Gennaro 1999]) a set of secret key shares $\{\underline{SK}_1^{E'}, \ldots, \underline{SK}_n^{E'}\}$, verification key shares $\{\underline{PK}_1^{E'}, \ldots, \underline{PK}_n^{E'}\}$, and a master public key $PK^{E'}$, and securely distributes $(\underline{PK}^{E'}, \ldots, \{\underline{PK}_n^{E'}\}, \underline{SK}_j^{E'}$ to each node $j \in N$.

E' is the next Network Epoch $Sign_{\underline{s}}(x, \underline{SK}_j)$ outputs $\underline{\sigma}_x^j$, node j's signature share for some message x.

$VerifyShare_{\underline{s}}(x, \underline{\sigma}_x^j, \underline{PK}_j)$ determines whether a given signature share is valid.

$Combine_{\underline{s}}(\hat{\underline{\sigma}})$ takes a list $\hat{\underline{\sigma}}$ (which must consist of at least $\bar{m}$ key shares, each from a different node) and combines them to output a signature K such that for any two valid sets $\hat{\underline{\sigma}}$ and $\hat{\underline{\sigma}}'$, $Combine_{\underline{s}}(\hat{\underline{\sigma}}) = Combine_{\underline{s}}(\hat{\underline{\sigma}}')$.

$Verify_{\underline{s}}(x, K, \underline{PK})$ determines whether the combined signature is valid.

Let $UID_j = H(PK_j)$ denote the unique identifier of node j.

Let $Chain_j(B_i)$ represent the blocks at depth $\leq i$ in node j's chain that includes $B_i$.

Let $\text{Chain}_j[x:y](B_i)$ represent the blocks from rounds x to y on node j's chain that includes $B_i$.

Let $\text{SelectChain}_j(W_i,Z_i) \to Y_i \exists \{W_i,Z_i\}$ be a function that returns which chain to follow (to break a tie) by using a deterministic chain selection strategy that considers only information contained in $\text{Chain}_j(W_i)$ and $\text{Chain}_j(Z_i)$.

Let $\text{VerifyHeaderChain}_j(B_i)$ Z or FAIL be a function that retrieves and verifies the block headers contained in some other node j's $\text{Chain}_j(B_i)$ until a common ancestor block, Z, is identified or the process fails (headers fails to verify, can't locate common ancestor, etc.).

Additional Assumptions

The algorithms that follow rely on these additional assumptions:

Assume the existence of some trusted administrator Admin whose public key $PK_{Admin}$ is known to all nodes and whose secret key $SK_{Admin}$ is extremely well-protected.

Note that Admin preferably is not in possession of node private key material and consequently cannot witness blocks or participate in leader selection.

Assume each node is aware of all others, knows $PK_j$ for every node j, and has a sorted list $N=[UID_1, \ldots, UID_n]$ such that every honest node's list is identical.

Let $N_E$ denote the value of N during Network Epoch E.

Assume there exists some health monitoring process Health such that the output of Health(j) is a boolean value indicating whether or not node j is currently capable of serving as an effective leader (i.e. whether it has the resources required to finish mining a block within the duration of a mining round).

Assume the existence of some secure multicast protocol Broadcast such that any node can call $\text{Broadcast}_N(x)$ to reliably propagate a message x such that it is received by all honest nodes in N within some maximum time $\Delta$ when the network is healthy. This protocol includes an authentication mechanism, such that any node receiving a broadcasted message can verify the identity of the originating node and the integrity of the message contents.

Assume all nodes have roughly synchronized clocks such that the difference in clock values between any two nodes at any given time is at most $\delta$.

Clocks preferably are independently synchronized to a trusted external source.

Deterministic Leader Selection

Objectives

The design preferably selects leaders deterministically while preventing an adversary from predicting or influencing the identity of any future leader. Such a deterministic scheme offers several desirable properties:

Ability to guarantee a fixed maximum number of leaders per round

Ability to place an upper bound on the degree of branching/forking

Avoidance of unnecessary zero-miner rounds when all nodes are honest and healthy To obtain these properties, preferably all nodes (or those participating) agree on the value of a random number at the beginning of each round from which the identity of that round's leader can be derived. Ideally this should be done with as little communication as possible and in a way that requires input from at least one honest node.

Selection Algorithm

To participate in the leader selection process for round i during Network Epoch E, a node j computes $\underline{\sigma}_i^j = \text{Sign}_s(i, \underline{SK}_j^E)$ and calls $\text{Broadcast}(i, E, \underline{\sigma}_i^j)$ at time $\tau_i$.

Note that the identity of every round's leader is determined as soon as $\text{Gen}_s(\bullet)$ is run. Broadcasting a signature share serves only to help reveal that predetermined identity.

Upon receiving a signature share from any node j', a node j calls $\text{VerifyShare}_s(i, \underline{\sigma}_i^{j'}, \underline{PK}_{j'}^E)$ to determine whether it is valid.

Once node j has compiled a set $\hat{\underline{\sigma}}_i$ of at least m valid signature shares (each generated by a different node, including itself), it then computes $K_i = \text{Combine}_s(\hat{\underline{\sigma}}_i)$.

If $\text{Verify}_s(i, K_i, \underline{PK}^E)$ is true, j determines the next leader to be $A_i = N_E[\overline{H(K_i)} \% n]$ If fewer than m valid signatures shares are received or if $\text{Verify}_s(i, K_i, \underline{PK}^E)$ is false, j cannot determine the next leader and must insert a null block for round i.

Properties

The leader selection process for each round preferably operates without input from any previous round.

The identity of each leader preferably is completely independent from the identity of all previous leaders.

Block Confidence and Finalization

For the system to reach consensus on an ordering of transactions, a mechanism or basis for asserting that a block has been "finalized" is provided—that is, it has been permanently added to the blockchain so that the ordering of its transactions may be agreed upon by all system components.

Additionally, and as described, it is useful to have some notion of "confidence" in a block prior to that block's finalization. This is a metric representing the probability that a block will be finalized.

Finalization Algorithm

At time $\tau_{i+1}$, $A_i$ calls $\text{Broadcast}(\underline{B}_i, \sigma_{H(B_i)}^{A_i})$ After receiving and verifying $B_i$, a node j computes $\sigma_{H(B_i)}^j = \text{Sign}_s(H(B_i), SK_j)$ and calls $\text{Broadcast}(i, H(B_i), \sigma_{H(B_i)}^j)$. At this point, we say that j has witnessed $B_i$.

Whenever a node j witnesses some block $B_i$ or receives a valid signature share from another node indicating that node has witnessed $B_i$, it updates its aggregate signature $\hat{\sigma}_{B_i}$ and sets $$C_j(B_i) = \frac{|\hat{\sigma}_{B_i}|}{n},$$

where $|\hat{\sigma}_{B_i}|$ is the number of signature shares received.

If a node witnesses more than one block for the same round, all its witnessing signatures for current and future rounds preferably are ignored. A node behaving this way is either compromised or faulty, and therefore must be removed from the network, scorched, verified as secure, and added back to the network as a new node (with new identity keys).

For each ancestor b of $B_i$, j sets $C_j(b) = \max(C_j(b), C_j(B_i))$

Once $C_j(B_i) \geq \omega$, $B_i$ has been finalized and must never be removed from j's chain.

Note that the finalization of a block is a global truth, but different nodes will learn that a given block has been finalized at different times depending on when they receive witnessing signatures.

Null Blocks

If a node does not receive a valid $B_i$ by time $\tau_{i+1} + \Delta$, or if it does not know the identity of $A_i$, then it inserts a null block for round i (denoted $\beta_i$) and calls Broadcast(i, $H(\beta_i)$, $\sigma_{H(\beta_i)}{}^j$) just as if it were witnessing a regular block.

A node may receive signature shares witnessing both null and non-null blocks in a given round, but only updates its confidence in the actual block that is being witnessed.

If $A_i$ determines that Health($A_i$)=False at any point during round i it should preemptively append $\beta_i$ to its blockchain and call Broadcast(i,$H(\beta_i)$,$\sigma_{H(\beta_i)}{}^{A_i}$). Any node j that receives this message should immediately call Broadcast(i,$H(\beta_i)$,$\sigma_{H(\beta_i)}{}^j$), as it knows no non-null block will be mined that round. This allows nodes to establish a higher degree of confidence in $\beta_i$ (and therefore in its ancestors), thereby speeding up recovery after a fork.

Round Timing

A node may participate in leader selection for a given round arbitrarily early, though ideally the identity of each leader should remain unknown until it actually needs to serve as leader. This is to prevent an adversary from (for example) carrying out a DoS attack against a leader to prevent it from finishing its block. However, honest nodes must participate in the leader selection process sufficiently early for $A_i$ to learn its identity with ample time to generate $B_i$ by time $\tau_{i+1}$. To facilitate this, round i begins at time $\tau_i$ with each honest node j participating in the identification of leader $A_i$ by calling Broadcast(i,E,$\sigma_i{}^j$).

Once $A_i$ learns its identity and finishes verifying $B_{i-1}$, it can broadcast a block announcement for $B_i$, and begin to generate and stream $B_i$ to other nodes. It must finish sending all data relevant to $B_i$ by the start of the next round at time $\tau_{i+1}$. Once any node j finishes verifying $B_{i-1}$, it calls Broadcast(i,$H(B_{i-1})$, $\sigma_{H(B_{i-1})}{}^j$) to witness that block—or, if it cannot verify (or does not receive) $B_{i-1}$ by time $\tau_i+\Delta+\underline{\Delta}$, then it calls Broadcast(i,$H(\beta_{i-1})$, $\sigma_{H(\beta_{i-1})}{}^j$) to witness a null block for the round instead.

A node may notify external entities (e.g. wallet services) whether it is adding $B_i$ or $\beta_i$ to its chain as soon as it receives a finalization threshold of witnessing signatures for either one, which is expected to happen by time $\tau_{i+1}+2\Delta+\underline{\Delta}$ when the network is healthy. If for some reason a node cannot confirm that $B_i$ or $\beta_i$ have been finalized by that time, it may wait up to one round time later to export this information (at $\tau_{i+2}+2\Delta+\underline{\Delta}$).

Figure 14:
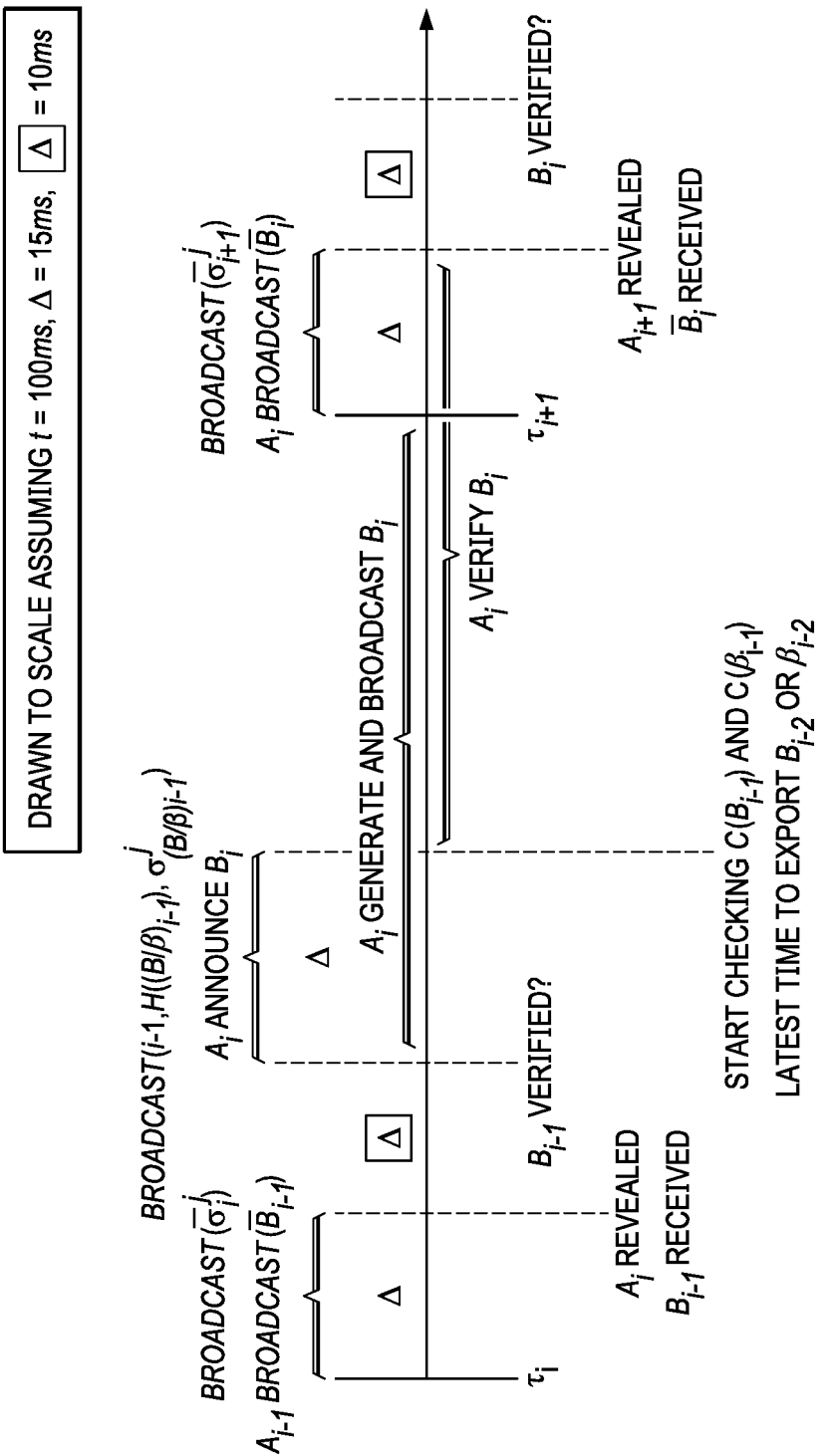
FIG. 14 depicts a timing diagram for a consensus round and, in particular, events associated with leader election, block generation, and block witnessing.

The diagram in FIG. 14 shows the timing of events that occur in round i pertaining to leader election, block generation, and block witnessing. Note that this diagram and its explanation above exclude consideration of the clock synchronization skew $\delta$ as it is expected to be negligible with respect to the other delays involved.

Transaction Receipts and Finalization

The approach herein guarantees that some minimum number of transactions per second are added to blocks that will eventually be finalized. This assumes at least m honest and healthy nodes that are able to communicate with one another.

To make this guarantee, each block must be able to hold at least some number of transactions, where the number is a function of the transaction rate we need to guarantee, the probability of malicious or failed nodes being elected leader, and the duration of a mining round:

Fork Resolution

The design limits the causes of forks except due to a network partition, due to a software problem, or due to a subset of nodes rejecting $B_i$ and witnessing a null block, $\beta_i$, because they receive the block header, $\underline{B}_i$, after time $\tau_i+t$.

Fork resolution is the same for all these situations and should exhibit the following properties:
  No finalized blocks are displaced (removed from the chain on any node)
  Low confidence blocks will not displace high confidence blocks without a high confidence block replacing a low confidence block in an earlier round.
  Fork resolution on a node will terminate and should be linear in cost relative to the depth of the fork and the number of transactions involved.
  Given a fork does not persist longer than the in memory transaction history (hours or days), during resolution non-conflicting transactions on a displaced chain should be successfully revalidated and get added to the main chain, or be properly discarded as duplicates.

Overall Fork Resolution Algorithm

Forks preferably are resolved using a process involving four high level steps:
  Detection: The process of determining if a node is on a lower confidence chain, and if it is, recording the depth and block hash of the common ancestor to which the block was reset and the current depth y so the node can later replay the transactions contained in the lower confidence chain after it reaches a depth x>y.
  Reset: The brain (the computing node executing the consensus as the node coordinator) stops mining and instructs the other node components to reset to depth z. The brain waits until the reset is complete before entering the next step. A temporary mempool containing transactions from the abandoned chain is created in each transaction handler.
  Recover (which may occur in parallel with the Reset): The node enters the normal recovery process in this step with some modifications:
    When a node finalizes a block, it removes the transactions in the finalized block from the temporary mempool.
  Replay: The replay step is performed when the depth y is reached, the transactions handlers will revalidate and broadcast transactions from the abandoned chain and send notifications of any conflicting transactions.

Header Chain Verification Algorithm

The chain verification process verifies the legitimacy of the received chain by verifying that it has a higher confidence than all the blocks in the local chain from depth i backwards to the common ancestor depth z. It will only return z if all the headers and confidence values in the received chain verify and it has a higher confidence than the local chain.

VerifyHeaderChain$_j$($B_i$)→z or FAIL:
  Let R represent the received blocks in the same chain as $B_i$.
  Let L represent the local chain's blocks.
  Let C(local) represent this nodes local chain confidence, which is initially set to the confidence of $L_i$.
  Let C (remote) represent the received remote chain confidence, which is set to $C(B_i)==C(R_i)$.
  Let j represent the depth in the loop, initially set to i.
  While $L_j$!=$R_j$:
    Get header and confidence of $R_j$ parent $R_{j-1}$
    Verify header and confidence of $R_{j-1}$
      If fail, output FAIL and exit
    If $C(R_{j-1})$>C(remote), set C(remote)=$C(R_{j-1})$
    If $C(L_{j-1})$>C(local), set C(local)=$C(L_{j-1})$
    If C(remote)<C(local) output FAIL and exit.
      Broadcast($\underline{L}_{j-1}$,$\hat{\sigma}_{L_{j-1}}$)
    Else, set j=j−1
  Return j
    $L_j$==$R_j$ at this point, which means the common ancestor is at depth j.

Chain Selection Algorithm

The chain selection strategy is used to deterministically select which chain to follow in the case of two candidate chains that have the same confidence level.

SelectChain($W_i$, $Q_i$, z)→$Y_i$∃{$W_i$, $Q_i$}

Parameters:
- a. $W_i$ and $Q_i$ are two blocks at the depth i that represent tips of two different chains with a common ancestor at depth z.
- b. Returns $W_i$ or $Q_i$ Properties:
- a. Deterministic given the same chain view which represents blocks at depth [z+1:i]

Strategies:
- a. Select the chain based on a highest preference leader at the depth z+1
- b. Based on the chain with the highest number of transactions.
- c. Based on the chain with the lowest number of null blocks in between the depths [z+1:i]
- d. Weighted combination of the above strategies with the first (a) being the last resort tie breaker.

Fork Detection Algorithm

A fork is detected when a node receives a block announcement referencing an unknown parent block hash. The node will retrieve the parent block's header, verify its confidence value, and check if that value is equal to or higher than its current chain. If it is, the node will start retrieving and verifying the header chain until a common ancestor is identified or the process fails. The chain with the highest verifiable confidence is referred to as the main chain. If two chains at the same depth, x, have the same confidence a deterministic chain selection strategy is applied based on information in blocks at depths<=x through the use of SelectChain($W_i$,$Z_i$,c) where ($W_x$,$Z_x$) represent the blocks at the tips of the tied chains, and c representing the depth of their common ancestor.

Assume the tip of the node's chain is block Y at depth y and has confidence C(Y)

Assume the node keeps track of confidence changes in its chain, and denote p to be the depth of the block where the chain's confidence last dropped.

The node receives an announcement of block X2 with an unknown parent block X.

The node queries for the header of block X at depth x in the chain and verifies its confidence value C(X).

If x!=y, exit process.

If C(X)>=C(Y), enter chain verification process Verify-HeaderChain$_j$($B_i$) if output:

common ancestor block Z at depth z, continue

FAIL, exit process

If C(X)==C(Y), use a deterministic chain selection strategy SelectChain(X, Y, z) to determine if the node is not on the main chain:

If output is Y, the node is on the main chain, exit process

The node is not on the main chain or has fallen behind on the main chain (Y==Z), if Y!=Z enter the Reset process, otherwise enter Recovery.

Chain Reset Algorithm

Resets a node from depth y to depth z and moves the transactions contained in Chain [z:y](Y) to a temporary mempool for future replay. Y is the block at the tip of the node chain before reset.

The computing node executing the consensus as the node coordinator issues a "Reset to depth z" directive to the node components. This is not a snapshot recovery directive.

The Transaction Handlers will forward the command to UTXO Handlers, and move the transactions included in blocks at depth y to depth z+1 to a temporary mempool.

The UTXO Handlers will attempt to reset their UTXO state to the specified depth. If the reset fails the brain will be notified.

Reset failed:

The brain will identify the closest snapshot (could be on the high confidence chain) and command the UTXO Handlers to restore from that snapshot.

The UTXO Handlers will send a notification when they successfully restore their state from the specified Snapshot.

Chain Recovery Algorithm

While not caught up with the main chain:

The node executing the consenssu will fetch and verify the block header for the next block and ensures it's on the main chain This step was completed during Detection for block headers at depths<x Instruct other components to verify the block. This follows a similar process to the normal block verification workflow.

The Transaction Handlers will request and validate/verify each segment in the block and send the segments merkle root to the Brain if all the segment's transactions are successfully assigned, or a failure if any failed.

The only difference between the process described here and normal transaction validation is that when a block is finalized, the Transaction Handler will attempt to remove the finalized transactions from the temporary mempool if they are there.

When is a node considered synced/caught up?

If the node's current depth, y, is one less than the depth, w, of the block announcement received. w−1==y.

Transaction Replay Algorithm

This is the process of replaying transactions that were on the abandoned chains and identifying conflicts. This process starts once the node that was reset to depth z reaches its original depth y in the recovery process. Starting this process at depth y prevents the rebroadcasting of any duplicate transactions present in blocks from the adopted chain at depths [z+1:y] because any duplicates are removed from the temporary mempool when the blocks are validated.

The Transaction Handler will attempt to move the transactions from the temporary mempool that contains the transactions included in the minority chain to the main mempool.

If a transaction is successfully admitted to the main mempool, it will be forwarded to other nodes.

If a transaction fails to be admitted (a double spend), a "Conflict Detected" notification will be sent out to the appropriate party(ies).

If any of the transactions that were on the temporary mempool fail to be assigned to future blocks or time out after being added to the main mempool, a "Conflict Detected" notification will be sent out to the appropriate party(ies).

Network Configuration Changes

This system preferably requires some mechanism for implementing configuration changes. At a high level, the implementation of a configuration change is marked by incrementing the Network Epoch $E \Rightarrow E'$. Every node in the new configuration must witness (directly or indirectly) the first block which contains $E'$ before that block can be considered finalized.

Configuration parameters may include things like $\Delta$, $\omega$, t, and parameters of H. Most likely though is a change to the set of nodes that comprise the network $N \Rightarrow N'$. For example, adding nodes with increased transaction processing capacity or removing nodes that have crashed or become compromised. All nodes must agree on the point in time at which a change to N takes effect. If two nodes disagree on the value of $N_i$ for some round i, they are very likely to disagree on the identity of $A_i$ and on the value of $C(B_i)$, either of which would be extremely problematic. Since the blockchain already serves to establish consensus among nodes, the ideal solution is one in which configuration change information resides in a block.

Preferably, configuration changes are initiated by Admin.

Before a configuration change can take effect, the new set of nodes N' having public keys, $\{PK_1, \ldots, PK_{n'}\}$ generate a new set of leader selection keys, preferably by collectively executing $Gen_s(E', \{PK_1, \ldots, PK_{n'}\}, m')$, where the new threshold m' may or may not be equal to the previous threshold m. As this process requires participation from all honest nodes, completing it requires the network to be unpartitioned. Preferably this rekeying procedure takes place for every configuration change, even if N=N'.

Configuration Change Algorithm

The following steps allow Admin to implement a configuration change, transitioning the network from Epoch $E \Rightarrow E'$.

1. Admin determines a set J of nodes it wants to add to the network and/or a set $R \subset N$ of nodes to remove from the network. Thus, $N_{E'} = (N_E - R) + J$.
   Admin must know the identity key $PK_j$ for each node $j \in N_{E'}$, in advance.
   J and R may both be the null set, in which case $N_E = N_{E'}$.
2. Let K' be the sorted set of public identity keys $(\{PK_1, \ldots, PK_{n'}\})$ for all nodes in $N_{E'}$.
3. Admin determines an appropriate threshold m' for use by $N_{E'}$, in its leader selection signature scheme.
4. Admin constructs $Config_{E'}$, which contains all information relevant to the new network configuration, at least including E', K', m'.
5. Admin computes $\sigma_{E'}^{Admin} = Sign_s(H(Config_{E'}), SK_{Admin})$.
6. Admin calls $Broadcast_{N_E}(M_{E'})$ for $M_{E'} = (Config_{E'}, \sigma_{E'}^{Admin})$.
   It may also call $Broadcast_{\hat{R}}(M_{E'})$ for some $\hat{R} \subseteq R$, though this is not strictly necessary.
7. Each node in $N_E$, confirms that $Verify_s(H(Config_{E'}), \sigma_{E'}^{Admin}, PK_{Admin})$ outputs True.
8. $Gen_s(E', K', m')$ is executed.
9. Once any node $j \in (N_E - R)$ has received its leader selection keys for epoch E' ($\underline{PK}^{E'}$, $\{\underline{PK}_1^{E'}, \ldots, \underline{PK}_{n'}^{E'}\}$, $\underline{SK}_j^{E'}$), next block it generates as leader is a config block containing $Config_{E'}$ and $\sigma_{E'}^{Admin}$.
   j must continue using Network Epoch E for any intervening null blocks it generates.
   j must continue handling blocks from other nodes with Network Epoch E normally (using its old set of keys) until it generates or receives a block with Network Epoch E'.
10. If a node receives a block with Network Epoch E' without first receiving $M_{E'}$, it should ignore it (but not discard it) and contact Admin to see if it missed a configuration change message. There are two possible scenarios in which this may occur:
    The node is a member of R and the membership change completed without it.
    The block was sent by a malicious or faulty node.
11. If a node has received $M_E$, but receives a block with Network Epoch E' from a node in $N_{E'}$, before receiving its new set of leadership keys from $Gen_s(E', K', m')$, it must halt until it receives those keys.
12. Once a node j generates or witnesses a block in round i with Network Epoch E' it must compute $\underline{\sigma}_j^{i'}$, using $\underline{SK}_j^{E'}$ for every i'>i. At this point it may delete its leader selection keys for all configurations with E<E' as they will not be reused. It may also ignore any future block announcements with Network Epoch E<E'.
13. Witnessing signatures of nodes in R do not contribute confidence to any blocks with Network Epoch E'.
14. No block with Network Epoch E' can be considered finalized until at least one such block has been witnessed by every node in $N_{E'}$. Descendants of that block require only the standard finalization threshold of $\omega$.
15. If a node receives a configuration change message $M_{E'}$ while the key generation process for a prior message $M_E$ (for some E<E') is still ongoing, it must abandon the old process and start over with the set of nodes specified in $M_{E'}$.

While Network Epoch numbers are monotonically increasing, numbers will be skipped on the chain if a configuration change is aborted in favor of a newer one. In this case, the config block initializing a new Network Epoch should include a signature from Admin indicating any Network Epochs that were skipped.

Key Management

At a high level, the management of all leader selection and identity keys preferably is driven by administrative messages. There are two types of rekey events that typically occur:

1) Leader selection key shares change.
2) Identity keys change. This requires a simultaneous leader selection key share change.

There exists a common administrative key that has a CA. A public portion of both the administrative key and administrative CA preferably is stored in the genesis block on the blockchain.

Administrative Key Rotation

At any point in time a new administrative key can be broadcast to the network signed by the administrative CA. This id placed in the next config block by the next generating node. The CA itself can be rotated using a similar operation. The CA private key should be stored offline in a secured manner.

Identity Keys

Identity keys are part of an asymmetric cryptosystem (S) that supports multi-signatures. Each node has a unique and permanent identity key, the public portion of which is published to the blockchain. When this key is rotated, the node is treated like a new node by the rest of the system. Each node's identity keys can be issued and rotated independently from those of other nodes as follows:

Admin asks a node to generate a new identity key and provide proof that it owns this key. Admin then issues a signed network configuration change message to the network containing the node's new identity key (and not its old one). This initiates standard a network configuration change procedure, which results in the node being added to the network with its new identity key and its old key being revoked.

The public portion of identity keys are published on the blockchain so they are verifiable and useable by wallet services. The published config block header contains the full list of identity keys as well as a signature from Admin attesting to their validity. Use of the administrative keys allows these new identity keys to be verified regardless of confidence in the block. The Network Epoch serves to prevent replay attacks with these key changes.

Leader Selection Key Shares

Leader selection key shares are part of an (m,n)-threshold cryptosystem ($\underline{S}$) where each node holds a secret key share.

Leader Selection Key Initialization & Rotation

Each time Admin initiates a network configuration change, the set of nodes in the new configuration must generate a new set of leader selection keys. This process is detailed in the network configuration change section herein. Initiating this change requires that Admin knows the public identity key of every node in the new configuration, and that every node in the new configuration knows Admin's public key. Each node in the new configuration will obtain its new secret leader selection key share, the public leader selection key share of each other node, and the master leader selection public key.

The next non-null block generated by one of the nodes in the new configuration will be a config block which contains (at a minimum) the new Network Epoch number, the public identity keys of all nodes in the configuration, the leader selection master public key, and the new leader selection threshold value m. It must also contain Admin's signature attesting to this and any other configuration information that may be included.

It is not desirable (or perhaps even possible) to rotate a single node's leader selection keys without rotating the leader selection keys of all other nodes simultaneously. If Admin wants to rotate leader selection keys without changing any other configuration parameters, it simply initiates a configuration change that is identical to the previous configuration change with the exception of an incremented Network Epoch number. Leader selection keys preferably are used for the span of a single Network Epoch.

System Bootstrap/Genesis Block Handling

The genesis block preferably contains the first administrative CA and leaf certificate (cert). The first trusted administrative CA and leaf cert must be delivered to each node out-of-band by some trusted method.

Prior to the first block published using the leader selection algorithm, a leader is selected. This requires the identity and leader selection key rotation procedures to be followed, with their results stored in the genesis block.

Persistence

Each node j must maintain a table of witnessed blocks. Before calling Broadcast(i,H($B_i$),$\sigma_{H(B_i)}^{j}$) to witness block $B_i$, it appends (i,H($B_i$)) to that table. If its table contains some entry (i,H($B_i$)), it must not witness any round-i block whose hash does not match H($B_i$). This prevents a node from double-voting after recovering from a crash.

Each node j must maintain ($FIN_j$, H($B_{FIN_j}$), $\hat{\sigma}_{B_{FIN_j}}$), the round number, hash, and aggregate witnessing signature of its most recently finalized block. When this value is updated, any entries in the table of witnessed blocks with i<$FIN_j$ may be discarded.

Each node must maintain its current Network Epoch E. This value is updated before a node generates or sends a witness signature for a block with a new Network Epoch.

Each node j must persist ($\underline{PK}^E$, $\{\underline{PK}_1^E, \ldots \underline{PK}_n^E\}$, $\underline{SK}_j^E$), its leader selection keys for Network Epoch E from the time they are received until it after it has generated or witnessed a block with Network Epoch E'>E (at which point it will have already persisted the leadership keys for E').

Each node j must persist its identity keys ($PK_j$, $SK_j$). If Admin requests that it generate new identity keys, it updates persists the new keys immediately before sending the new public key to Admin, and may delete the old keys after generating or witnessing (with its new keys) a config block containing its new public identity key.

If a node's identity keys are ever lost during a crash, it will be treated as a new node upon recovery and all of its other persisted state should be discarded.

Wallet Services

Leader Selection

Wallet services preferably is aware of leader selection. It can use the master public leader selection key to verify the identity of the leader for each round in which it receives valid signature shares from at least m nodes.

Confidence

Wallet services preferably is aware of block confidence:

Each wallet services component receiving the block header stream will be responsible for verifying the aggregate witness signatures it receives alongside the block header stream. Confidence updates for a block will occur when new signatures for it or its descendants are received.

Each wallet services component receiving the block header stream must be capable of handling identity key rotations by correctly interpreting, verifying and loading new identity keys from config blocks (this implies that wallet services can verify administrative signatures).

Wallet services manages policies and the execution of transaction logic based on the associated confidence of a wallet's valid UTXOs. For example, wallet services will provision, manage, and execute policies based on these implications/constraints, e.g., whether or not a wallet will accept low confidence payments or whether a wallet will use a low confidence UTXO in a payment, etc.

FIG. 14 depicts a timing diagram for a consensus round and, in particular, events associated with leader election, block generation, and block witnessing.

With the above description, what is now claimed follows below.

The invention claimed is:

1. A method operative in association with a system including a set of nodes comprising transaction handling computing elements that comprise a network core that receive and process transaction requests into an append-only immutable chain of data blocks, wherein a data block is a collection of transactions, and wherein presence of a transaction recorded within a data block is verifiable via a cryptographic hash, wherein the transaction requests originate from legacy computing infrastructure associated with a third party, wherein each node of the set of nodes has an associated public key, comprising:

configuring, as physical computing infrastructure, an overlay network between the legacy computing infrastructure and the network core, the overlay network comprising a plurality of edge servers that act an entry points for the transaction requests entering the network core; and mining, by the system, individual segments of a block according to a confidence-based consensus algorithm using the set of nodes and a multi-signature cryptographic approach, wherein the mining further comprises a node of the set of the nodes providing one or more other nodes of the set of the nodes with a cryptographic signature bearing witness by signing the block that the block is valid;

wherein, according the multi-signature cryptographic approach, cryptographic signatures from multiple nodes of the set of the nodes are aggregated into an aggregate witness signature to represent a confidence measure representing a probability that the block will be finalized into the append-only immutable chain, the aggregated witness signature being associated with a single public key that is an aggregate of the public keys of the multiple nodes;

wherein a verify node of the set of nodes verifies the confidence measure using the aggregate witness signature, the single public key and a list of the multiple nodes by aggregating the public keys of the multiple nodes identified on the list to generate a resulting public key, determining whether the resulting public key is the same as the single public key, and, based on determining that the resulting public key is the same as the single public key, thereby verifying the aggregate witness signature using the single public key;

detecting, by the system, a fork associated with the append-only immutable chain of data blocks;

upon detecting the fork, identifying, by the system, a main chain and a displaced chain by determining that the main chain has a confidence value, based on the confidence measures of blocks, that is higher than a confidence value of the displaced chain; and recovering, by the system, from the fork at least in part by replaying transactions on the displaced chain, wherein the recovering further comprises validating one or more non-conflicting transactions, and adding the non-conflicting transactions to the main chain unless they are duplicates.

2. The method as described in claim 1, the method further comprising identifying, by the system, a conflicting transaction, and issuing a notification regarding the conflicting transaction.

3. The method as described in claim 1, wherein the fork is a result of a network outage.

4. The method as described in claim 2 wherein the network core comprises a plurality of wallets.

5. The method as described in claim 4 wherein a given wallet in the plurality of wallets verifies the aggregate witness signature.

6. The method as described in claim 1, further comprising:
applying, by the system, a deterministic tie-breaking strategy to the main chain and the displaced chain based on determining that the confidence values of the main chain and the displaced chain are the same.

7. The method as described in claim 1, wherein the consensus algorithm is carried out in fixed-length rounds across a set of transaction handling computing elements.

8. The method as described in claim 7, further comprising:
selecting, by the system, one of the transaction handling computing elements as a leader for each of the rounds.

9. The method as described in claim 1 wherein, during execution of the consensus algorithm, one or more transaction handling computing elements finalize one or data blocks into the append-only immutable chain of data blocks.

10. The method as described in claim 1, wherein a fork occurs in association with a network partition in the network core.

11. The method as described in claim 1 wherein the append-only immutable chain of data blocks is a blockchain.

12. The method as described in claim 1 wherein transactions that do not conflict over Unspent Transaction Outputs (UTXOs) are a nonconflicting transaction.

13. The method as described in claim 2 wherein transactions that conflict over Unspent Transaction Outputs (UTXOs) are the conflicting transaction.

* * * * *